United States Patent
Henry et al.

(10) Patent No.: US 7,529,368 B2
(45) Date of Patent: May 5, 2009

(54) APPARATUS AND METHOD FOR PERFORMING TRANSPARENT OUTPUT FEEDBACK MODE CRYPTOGRAPHIC FUNCTIONS

(75) Inventors: G. Glenn Henry, Austin, TX (US); Thomas A. Crispin, Austin, TX (US); Terry Parks, Austin, TX (US)

(73) Assignee: VIA Technologies, Inc., Taipei (TW)

( * ) Notice: Subject to any disclaimer, the term of this patent is extended or adjusted under 35 U.S.C. 154(b) by 832 days.

(21) Appl. No.: 10/826,745

(22) Filed: Apr. 16, 2004

(65) Prior Publication Data
US 2005/0160279 A1 Jul. 21, 2005

Related U.S. Application Data

(63) Continuation of application No. 10/674,057, filed on Sep. 29, 2003, now Pat. No. 7,321,910.

(60) Provisional application No. 60/508,927, filed on Oct. 3, 2003, provisional application No. 60/508,679, filed on Oct. 3, 2003, provisional application No. 60/508, 604, filed on Oct. 3, 2003, provisional application No. 60/508,076, filed on Oct. 2, 2003, provisional application No. 60/507,004, filed on Sep. 29, 2003, provisional application No. 60/507,003, filed on Sep. 29, 2003, provisional application No. 60/507,002, filed on Sep. 29, 2003, provisional application No. 60/507,001, filed on Sep. 29, 2003, provisional application No. 60/506,991, filed on Sep. 29, 2003, provisional application No. 60/506,979, filed on Sep. 29, 2003, provisional application No. 60/506,978, filed on Sep. 29, 2003, provisional application No. 60/506,971, filed on Sep. 29, 2003, provisional application No. 60/464,394, filed on Apr. 18, 2003.

(51) Int. Cl.
*H04J 1/06* (2006.01)
(52) U.S. Cl. .................................. 380/37

(58) Field of Classification Search .................... 380/37
See application file for complete search history.

(56) References Cited

U.S. PATENT DOCUMENTS 4,168,396 A * 9/1979 Best .......................... 713/190

(Continued)

FOREIGN PATENT DOCUMENTS

CN 1309351 A 8/2001

(Continued)

OTHER PUBLICATIONS

Kim, Ho Won et al. "Design and Implementation of a Private and Public Key Crypto Porcessor and its Application to a Security System," IEEE Transactions on Consumer Electronics. vol. 50, No. 1, Feb. 2004. pp. 214-224.

(Continued)

*Primary Examiner*—Nasser G Moazzami
*Assistant Examiner*—Daniel L Hoang
(74) *Attorney, Agent, or Firm*—Richard K. Huffman; James W. Huffman

(57) ABSTRACT

An apparatus and method for performing cryptographic operations on a plurality of input data blocks. In one embodiment, an apparatus for performing cryptographic operations is provided. The apparatus includes a cryptographic instruction, OFB mode logic, and execution logic. The cryptographic instruction is received by a pipeline microprocessor as part of an application program executing on the pipeline microprocessor. The cryptographic instruction prescribes one of the cryptographic operations. The one of the cryptographic operations includes a plurality of OFB block cryptographic operations performed on a corresponding plurality of input text blocks. The OFB mode logic is operatively coupled to the cryptographic instruction. The OFB mode logic directs the pipeline microprocessor to update pointer registers and an initialization vector location for each of the plurality of CFB block cryptographic operations. The execution logic is operatively coupled to the OFB mode logic. The execution logic executes the one of the cryptographic operations.

34 Claims, 10 Drawing Sheets

U.S. PATENT DOCUMENTS

| | | | |
|---|---|---|---|
| 4,250,546 A | 2/1981 | Boney et al. | |
| 4,275,265 A | 6/1981 | Davida et al. | |
| 4,278,837 A | 7/1981 | Best | |
| 4,316,055 A | 2/1982 | Feistel | |
| 4,319,079 A | 3/1982 | Best | |
| 4,386,234 A | 5/1983 | Ehrsam et al. | |
| 4,465,901 A | 8/1984 | Best | |
| 4,633,388 A | 12/1986 | Chiu | |
| 4,668,103 A | 5/1987 | Wilson | |
| 4,731,843 A * | 3/1988 | Holmquist | 380/29 |
| 4,888,802 A | 12/1989 | Cooney | |
| 5,016,276 A | 5/1991 | Matumoto et al. | |
| 5,020,106 A | 5/1991 | Rabold et al. | |
| 5,134,713 A | 7/1992 | Miller et al. | |
| 5,161,193 A | 11/1992 | Lampson et al. | |
| 5,218,637 A | 6/1993 | Angebaud et al. | |
| 5,265,164 A | 11/1993 | Matyas et al. | |
| 5,613,005 A | 3/1997 | Murakami et al. | |
| 5,615,263 A | 3/1997 | Takahashi | |
| 5,631,960 A * | 5/1997 | Likens et al. | 380/2 |
| 5,633,934 A | 5/1997 | Hember | |
| 5,666,411 A | 9/1997 | McCarty | |
| 5,673,319 A | 9/1997 | Bellare et al. | |
| 5,828,873 A | 10/1998 | Lynch | |
| 5,870,470 A | 2/1999 | Johnson et al. | |
| 6,006,328 A | 12/1999 | Drake | |
| 6,021,201 A | 2/2000 | Bakhle et al. | |
| 6,026,490 A | 2/2000 | Johns-Vano et al. | |
| 6,081,884 A | 6/2000 | Miller | |
| 6,088,800 A | 7/2000 | Jones et al. | |
| 6,101,255 A | 8/2000 | Harrison et al. | |
| 6,182,216 B1 | 1/2001 | Luyster | |
| 6,246,768 B1 | 6/2001 | Kim | |
| 6,269,163 B1 | 7/2001 | Rivest et al. | |
| 6,301,362 B1 | 10/2001 | Matyas, Jr. et al. | |
| 6,324,286 B1 | 11/2001 | Lai et al. | |
| 6,434,699 B1 | 8/2002 | Jones et al. | |
| 6,570,988 B1 | 5/2003 | Venkatesan et al. | |
| 6,578,150 B2 | 6/2003 | Luyster | |
| 6,598,165 B1 | 7/2003 | Galasso | |
| 6,674,874 B1 | 1/2004 | Yoshida et al. | |
| 6,694,430 B1 | 2/2004 | Zegelin et al. | |
| 6,778,667 B1 | 8/2004 | Bakhle et al. | |
| 6,789,147 B1 | 9/2004 | Kessler et al. | |
| 6,795,930 B1 * | 9/2004 | Laurenti et al. | 713/324 |
| 6,861,865 B1 | 3/2005 | Carlson | |
| 6,919,684 B2 | 7/2005 | Brandes | |
| 6,973,187 B2 | 12/2005 | Gligor et al. | |
| 6,981,149 B1 | 12/2005 | Housley et al. | |
| 6,983,374 B2 | 1/2006 | Hashimoto et al. | |
| 7,054,445 B2 | 5/2006 | Gligor et al. | |
| 7,073,059 B2 | 7/2006 | Worely et al. | |
| 7,088,826 B2 | 8/2006 | Houlberg et al. | |
| 7,110,545 B2 | 9/2006 | Furuya et al. | |
| 7,124,302 B2 | 10/2006 | Ginter et al. | |
| 7,137,004 B2 | 11/2006 | England et al. | |
| 7,184,549 B2 * | 2/2007 | Sorimachi et al. | 380/37 |
| 7,194,090 B2 | 3/2007 | Muratani et al. | |
| 7,205,785 B1 | 4/2007 | Carlson | |
| 7,221,763 B2 | 5/2007 | Verbauwhede | |
| 7,337,314 B2 | 2/2008 | Hussain et al. | |
| 2001/0033656 A1 | 10/2001 | Gligor et al. | |
| 2001/0037450 A1 | 11/2001 | Metlitski et al. | |
| 2001/0046292 A1 | 11/2001 | Gligor et al. | |
| 2001/0050989 A1 | 12/2001 | Zakiya | |
| 2002/0048364 A1 | 4/2002 | Gligor et al. | |
| 2002/0101985 A1 | 8/2002 | Calvignac et al. | |
| 2002/0110239 A1 | 8/2002 | Venkatesan et al. | |
| 2002/0162026 A1 | 10/2002 | Neuman et al. | |
| 2002/0191784 A1 * | 12/2002 | Yup et al. | 380/37 |
| 2003/0097579 A1 | 5/2003 | England et al. | |
| 2003/0202658 A1 | 10/2003 | Verbauwhede | |
| 2003/0223580 A1 | 12/2003 | Snell | |
| 2004/0047466 A1 | 3/2004 | Feldman et al. | |
| 2004/0103263 A1 | 5/2004 | Colavin et al. | |
| 2004/0202319 A1 | 10/2004 | Hussain et al. | |
| 2004/0205331 A1 | 10/2004 | Hussain et al. | |
| 2005/0060558 A1 | 3/2005 | Hussain et al. | |
| 2005/0084076 A1 | 4/2005 | Dhir et al. | |
| 2005/0160279 A1 * | 7/2005 | Henry et al. | 713/189 |
| 2006/0056623 A1 | 3/2006 | Gligor et al. | |
| 2008/0031454 A1 | 2/2008 | Verbauwhede | |

FOREIGN PATENT DOCUMENTS

| | | |
|---|---|---|
| CN | 1431584 A | 7/2003 |
| DE | 3432721 A1 | 3/1986 |
| EP | 0913767 A2 | 5/1999 |
| EP | WO0144900 A2 | 8/2001 |
| EP | 1202150 A2 | 5/2002 |
| EP | 1215842 | 6/2002 |
| EP | 1271839 | 1/2003 |
| EP | 1298518 A2 | 4/2003 |
| EP | 1351432 A | 10/2003 |
| JP | 57176457 | 10/1982 |
| WO | WO0076119 A1 | 12/2000 |
| WO | WO0117152 | 3/2001 |
| WO | WO0184769 A | 11/2001 |
| WO | WO03036508 | 5/2003 |

OTHER PUBLICATIONS

Fischer et al. "Two Methods of Rijndael Implementation in Reconfigurable Hardware." Springer-verlag Berlin Heidelberg 2001, CHES 2001. LNCS 2162. pp. 77-92.

Dimond et al. "Application-specific Customisation of Multi-Threaded Soft Processors," Computers and Digital Techniques. IEEE Proceedings. vol. 153, Issue 3. May 2, 2006, pp. 173-180.

Anderson et al. "Crytographic Processors—A Survey." Proceedings of the IEEE. vol. 94, Issue 2. Feb. 2006. pp. 357-369.

Eberle et al. "Architectural Extensions for Elliptic Curve Cryptography over GF($2^M$) on 8-bit Microprocessors." Application-Specific Systems. Architecture Processors. 2005. ASASP 2005. 16th IEEE International Conference on Jul. 23-25, 2005. pp. 343-349.

Kuhn, Markus G. "Cipher Instruction Search Attack on the Bus-Encryption Security Microcontroller DS5002FP." Computer, IEEE Transactions on vol. 47, Issue 10. Oct. 1998. pp. 1153-1157.

Lee et al. "Efficient Permutation Instructions for Fast Software Cryptography." IEEE Micro, Nov. 2001. pp. 56-69.

McKinnon et al. "A Configurable Middleware Framework with Multiple Quality of Service Properties for Small Embedded Systems." Network Computing and Applications, 2003. NCA 2003. Second IEEE International Symposium on Apr. 16-18, 2003, Piscataway, NJ, USA IEEE, Apr. 16, 2003, pp. 197-204, XP010640251 ISBN: 0-7695-1938-5.

Tong et al. "A system level implementation of Rijndael on a memory-slot based FPGA card." Field-Programmable Technology, 2002. (FPT). Dec. 16, 2002, pp. 102-109, XP010636515 ISBN: 0-7803-7574-2.

Taylor D E et al. "Dynamic Hardware Plugins: Exploiting Reconfigurable Hardware for High-Performance Programmable Routers." Computer Networks, Elsevier Science Publishers B.V., Amsterdam, NL, vol. 38, No. 3, Feb. 21, 2002 pp. 295-310. XP004333786. ISSN: 1389-1286.

Elbirt A J et al. "Instruction-Level Distributed Processing for Symmetric-Key Cryptography." Parellel and Distributed Processing Symposium. 2003. Apr. 22, 2003. pp. 78-87. XP010645610 ISBN: 0-7695-1926-1.

Wu et al. "CryptoManiac: a fast flexible architecture for secure communication." Proceedings of the 28th. International Symposium on Computer Architecture, ISCA 2001. Jun. 30, 2001 pp. 104-113, XP01553867.

Gladman, Brian. "A Specification for Rijndael, the AES Algorithm." Online. Mar. 13, 2003. XP0023767287.

Backhus E. "AES in FPGAS Implementierung Des Advanced Encryption Standards in Hardware." Elektronik, WEKA Fachzeitschriftenverlag, Poing, DE, vol. 52, No. 8. Apr. 15, 2003 pp. 54-56, 58, 60. XP001160048.

Daemon J et al. "AED Proposal: Rijndael." AES Proposal Sep. 3, 1999. pp. 1-45, XP001060386.

Ulmann, B. "Designing a NICE Processor," Microprocessors and Microsystems, IPC Business Press LTD, London, GB. vol. 23, No. 5. Oct. 25, 1999. pp. 257-264. XP004321479 ISSN: 0141-9331.

Schneier. "Applied Cryptography, Protocols, Algorithms and Source Code In C." 2nd edition 2.3 One Way Funtions Applied Cryptography. Oct. 18, 1995. pp. 29-31, 193. XP002224472.

Rechenberg et al. "Informatik-Handbuch" Informatik-Handbuch, 2002, XP0023666659. p. 304-p. 324.

Institute for Applied Information Processing and Communications, Tu Graz: "Cryptographic Logic Unit /Crypto Unit Macrocell Webpages." Cryptographic Reduced Instruction Set Processor SmartCard, online Apr. 12, 2000. XP00236660 Retrieved from the Internet: URL: http://web.archive.org/web/20000412010535 http://www.laik.tu-graz.ac.at/Research/VLSI/CRISP/crisp.htm retrieved on Feb. 7, 2006! p. 8.

"Secure Microcontrollers for Smart Cards. AT90SC Summary" Announcement ATMEL. 1999, pp. 1-7, XP002291271.

Schneier: "Applied Cryptography." 1996. John Wiley & Sons, New York, US. XP002341498. pp. 30-31, pp. 189-211, pp. 446-459.

"IBM PCI Cryptographic Coprocessor CCA Basic Services Reference and Guide for IBM 4758 Models 002 and 023 with Release 2.40," IBM, Sep. 2001, XP002291430.

David E. Kimble, Mitsura Shimada, Navin Chander; "FIFO Architecture With In-Place Cryptographic Service"; Feb. 27, 2003;Texas Instruments Incorporated; Dallas, TX, USA.

Goots, N.D et al. "Fast DDP-based Ciphers: from Hardware to Software." Circuits and Systems. 2003. MWSCAS '03. Proceedings of the 46th IEEE International Midwest Symposium on vol. 2, Dec. 27-30, 2003 pp. 770-773 vol. 2.

Suwartadi, E. et al. "First Step Toward Internet Based Embedded Control System." Control Conference, 2004. 5th Asian. vol. 2, Jul. 20-23, 2004, pp. 1226-1231.

Michalsi, A. et al. "High-throughput Reconfigurable Computing: Deisgn and Implementation of an IDEA Encryption Cryptosystem on the SRC-6E Reconfigurable Computer." Field Programmable Logic and Applications, 2005. International Conference on Aug. 24-26, 2005 pp. 681-686.

* cited by examiner

| BCM VALUE | MODE |
|---|---|
| 0xC8 | ELECTRONIC CODE BOOK (ECB) |
| 0xD0 | CIPHER BLOCK CHAINING (CBC) |
| 0xE0 | CIPHER FEEDBACK (CFB) |
| 0xE8 | OUTPUT FEEDBACK (OFB) |
| ALL OTHER VALUES | RESERVED |

| | | | |
|---|---|---|---|
| 701 | 702 | 703 | 700 |

| MICRO OPCODE | DATAREG | REGISTER |
|---|---|---|
| ←——14 BITS——→ | ←—5 BITS—→ | ←—3 BITS—→ |

| VALUE | OPERATION |
|---|---|
| 000 | RESERVED |
| 001 | RESERVED |
| 010 | LOAD CONTROL WORD (CW) REGISTER |
| 011 | RESERVED |
| 100 | LOAD INPUT-0 (IN-0) REGISTER AND START CRYPTOGRAPHY UNIT |
| 101 | LOAD INPUT-1 (IN-1) REGISTER |
| 110 | LOAD CRYPTO KEY-0 REGISTER (LOWER 128 BITS OF KEY) |
| 111 | LOAD CRYPTO KEY-1 REGISTER (UPPER 128 BITS OF KEY) |

| VALUE | OPERATION |
|---|---|
| 000 | RESERVED |
| 001 | RESERVED |
| 010 | RESERVED |
| 011 | RESERVED |
| 100 | STORE OUTPUT-0 (OUT-0) REGISTER |
| 101 | STORE OUTPUT-1 (OUT-1) REGISTER |
| 110 | RESERVED |
| 111 | RESERVED |

FIG. 9

APPARATUS AND METHOD FOR PERFORMING TRANSPARENT OUTPUT FEEDBACK MODE CRYPTOGRAPHIC FUNCTIONS

CROSS-REFERENCE TO RELATED APPLICATIONS

This application claims the benefit of the following U.S. Provisional Applications, which are herein incorporated by reference for all intents and purposes.

| SER. NO. | FILING DATE | TITLE |
| --- | --- | --- |
| 60/506,971 | Sep. 29, 2003 | MICROPROCESSOR APPARATUS AND METHOD FOR OPTIMIZING BLOCK CIPHER CRYPTOGRAPHIC FUNCTIONS |
| 60/507,001 | Sep. 29, 2003 | APPARATUS AND METHOD FOR PERFORMING OPERATING SYSTEM TRANSPARENT BLOCK CIPHER CRYPTOGRAPHIC FUNCTIONS |
| 60/506,978 | Sep. 29, 2003 | MICROPROCESSOR APPARATUS AND METHOD FOR EMPLOYING CONFIGURABLE BLOCK CIPHER CRYPTOGRAPHIC ALGORITHMS |
| 60/507,004 | Sep. 29, 2003 | APPARATUS AND METHOD FOR PROVIDING USER-GENERATED KEY SCHEDULE IN A MICROPROCESSOR CRYPTOGRAPHIC ENGINE |
| 60/507,002 | Sep. 29, 2003 | MICROPROCESSOR APPARATUS AND METHOD FOR PROVIDING CONFIGURABLE CRYPTOGRAPHIC BLOCK CIPHER ROUND RESULTS |
| 60/506,991 | Sep. 29, 2003 | MICROPROCESSOR APPARATUS AND METHOD FOR ENABLING CONFIGURABLE DATA BLOCK SIZE IN A CRYPTOGRAPHIC ENGINE |
| 60/507,003 | Sep. 29, 2003 | APPARATUS FOR ACCELERATING BLOCK CIPHER CRYPTOGRAPHIC FUNCTIONS IN A MICROPROCESSOR |
| 60/464,394 | Apr. 18, 2003 | ADVANCED CRYPTOGRAPHY UNIT |
| 60/506,979 | Sep. 29, 2003 | MICROPROCESSOR APPARATUS AND METHOD FOR PROVIDING CONFIGURABLE CRYPTOGRAPHIC KEY SIZE |
| 60/508,927 | Oct. 3, 2003 | APPARATUS AND METHOD FOR PERFORMING OPERATING SYSTEM TRANSPARENT CIPHER BLOCK CHAINING MODE CRYPTOGRAPHIC FUNCTIONS |
| 60/508,679 | Oct. 3, 2003 | APPARATUS AND METHOD FOR PERFORMING OPERATING SYSTEM TRANSPARENT CIPHER FEEDBACK MODE CRYPTOGRAPHIC FUNCTIONS |
| 60/508,076 | Oct. 2, 2003 | APPARATUS AND METHOD FOR PERFORMING OPERATING SYSTEM TRANSPARENT OUTPUT FEEDBACK MODE CRYPTOGRAPHIC FUNCTIONS |
| 60/508,604 | Oct. 3, 2003 | APPARATUS AND METHOD FOR GENERATING A CRYPTOGRAPHIC KEY SCHEDULE IN A MICROPROCESSOR |

This application is a continuation-in-part of the following co-pending U.S. patent applications, all of which have a common assignee and common inventors.

| SER. NO. | FILING DATE | TITLE |
| --- | --- | --- |
| 10/674,057 now U.S. Pat. No. 7,321,910 | Sep. 29, 2003 | MICROPROCESSOR APPARATUS AND METHOD FOR PERFORMING BLOCK CIPHER CRYPTOGRAPHIC FUNCTIONS |

This application is related to the following co-pending U.S. patent applications, all of which have a common assignee and common inventors.

| SER. NO. | FILING DATE | TITLE |
| --- | --- | --- |
| 10/730,167 | Dec. 5, 2003 | MICROPROCESSOR APPARATUS AND METHOD FOR PERFORMING BLOCK CIPHER CRYPTOGRAPHIC FUNCTIONS |
| 10/800,768 | Mar. 15, 2004 | MICROPROCESSOR APPARATUS AND METHOD FOR OPTIMIZING BLOCK CIPHER CRYPTOGRAPHIC FUNCTIONS |
| 10/727,973 | Dec. 4, 2003 | APPARATUS AND METHOD FOR PERFORMING TRANSPARENT BLOCK CIPHER CRYPTOGRAPHIC FUNCTIONS |
| 10/800,938 | Mar. 15, 2004 | MICROPROCESSOR APPARATUS AND METHOD FOR EMPLOYING CONFIGURABLE BLOCK CIPHER CRYPTOGRAPHIC ALGORITHMS |
| 10/800,983 | Mar. 15, 2004 | APPARATUS AND METHOD FOR PROVIDING USER-GENERATED KEY SCHEDULE IN A MICROPROCESSOR CRYPTOGRAPHIC ENGINE |
| | HEREWITH | MICROPROCESSOR APPARATUS AND METHOD FOR PROVIDING CONFIGURABLE CRYPTOGRAPHIC BLOCK CIPHER ROUND RESULTS |
| | HEREWITH | MICROPROCESSOR APPARATUS AND METHOD FOR ENABLING CONFIGURABLE DATA BLOCK SIZE IN A CRYPTOGRAPHIC ENGINE |
| | HEREWITH | MICROPROCESSOR APPARATUS AND METHOD FOR PROVIDING CONFIGURABLE CRYPTOGRAPHIC KEY SIZE |
| | HEREWITH | APPARATUS AND METHOD FOR PERFORMING TRANSPARENT CIPHER BLOCK CHAINING MODE CRYPTOGRAPHIC FUNCTIONS |
| | HEREWITH | APPARATUS AND METHOD FOR PERFORMING TRANSPARENT CIPHER FEEDBACK MODE CRYPTOGRAPHIC FUNCTIONS |
| | HEREWITH | APPARATUS AND METHOD FOR GENERATING A CRYPTOGRAPHIC KEY SCHEDULE IN A MICROPROCESSOR |

BACKGROUND OF THE INVENTION

1. Field of the Invention

This invention relates in general to the field of microelectronics, and more particularly to an apparatus and method for performing transparent output feedback mode cryptographic operations in a microprocessor or other device.

2. Description of the Related Art

An early computer system operated independently of other computer systems in the sense that all of the input data required by an application program executing on the early computer system was either resident on that computer system or was provided by an application programmer at run time. The application program generated output data as a result of being executed and the output data was generally in the form of a paper printout or a file which was written to a magnetic tape drive, disk drive, or other type of mass storage device that was part of the computer system. The output file could then be used as an input file to a subsequent application program that was executed on the same computer system or, if the output data was previously stored as a file to a removable or transportable mass storage device, it could then be provided to a different, yet compatible, computer system to be employed by application programs thereon. On these early systems, the need for protecting sensitive information was recognized and, among other information security measures, cryptographic application programs were developed and employed to protect the sensitive information from unauthorized disclosure. These cryptographic programs typically scrambled and unscrambled the output data that was stored as files on mass storage devices.

It was not many years thereafter before users began to discover the benefits of networking computers together to provide shared access to information. Consequently, network architectures, operating systems, and data transmission protocols commensurately evolved to the extent that the ability to access shared data was not only supported, but prominently featured. For example, it is commonplace today for a user of a computer workstation to access files on a different workstation or network file server, or to utilize the Internet to obtain news and other information, or to transmit and receive electronic messages (i.e., email) to and from hundreds of other computers, or to connect with a vendor's computer system and to provide credit card or banking information in order to purchase products from that vendor, or to utilize a wireless network at a restaurant, airport, or other public setting to perform any of the aforementioned activities. Therefore, the need to protect sensitive data and transmissions from unauthorized disclosure has grown dramatically. The number of instances during a given computer session where a user is obliged to protect his or her sensitive data has substantially increased. Current news headlines regularly force computer information security issues such as spam, hacking, identity theft, reverse engineering, spoofing, and credit card fraud to the forefront of public concern. And since the motivation for these invasions of privacy range all the way from innocent mistakes to premeditated cyber terrorism, responsible agencies have responded with new laws, stringent enforcement, and public education programs. Yet, none of these responses has proved to be effective at stemming the tide of computer information compromise. Consequently, what was once the exclusive concern of governments, financial institutions, the military, and spies has now become a significant issue for the average citizen who reads their email or accesses their checking account transactions from their home computer. On the business front, one skilled in the art will appreciate that corporations from small to large presently devote a remarkable portion of their resources to the protection of proprietary information.

The field of information security that provides us with techniques and means to encode data so that it can only be decoded by specified individuals is known as cryptography. When particularly applied to protecting information that is stored on or transmitted between computers, cryptography most often is utilized to transform sensitive information (known in the art as "plaintext" or "cleartext") into an unintelligible form (known in the art as "ciphertext"). The transformation process of converting plaintext into ciphertext is called "encryption," "enciphering," or "ciphering" and the reverse transformation process of converting ciphertext back into plaintext is referred to as "decryption," "deciphering," or "inverse ciphering."

Within the field of cryptography, several procedures and protocols have been developed that allow for users to perform cryptographic operations without requiring great knowledge or effort and for those users to be able to transmit or otherwise provide their information products in encrypted forms to different users. Along with encrypted information, a sending user typically provides a recipient user with a "cryptographic key" that enables the recipient user to decipher the encrypted information thus enabling the recipient user to recover or otherwise gain access to the unencrypted original information. One skilled in the art will appreciate that these procedures and protocols generally take the form of password protection, mathematical algorithms, and application programs specifically designed to encrypt and decrypt sensitive information.

Several classes of algorithms are currently used to encrypt and decrypt data. Algorithms according to one such class (i.e., public key cryptographic algorithms, an instance of which is the RSA algorithm) employ two cryptographic keys, a public key and a private key, to encrypt or decrypt data. According to some of the public key algorithms, a recipient's public key is employed by a sender to encrypt data for transmission to the recipient. Because there is a mathematical relationship between a user's public and private keys, the recipient must employ his private key to decrypt the transmission in order to recover the data. Although this class of cryptographic algorithms enjoys widespread use today, encryption and decryption operations are exceedingly slow even on small amounts of data. A second class of algorithms, known as symmetric key algorithms, provide commensurate levels of data security and can be executed much faster. These algorithms are called symmetric key algorithms because they use a single cryptographic key to both encrypt and decrypt information. In the public sector, there are currently three prevailing single-key cryptographic algorithms: the Data Encryption Standard (DES), Triple DES, and the Advanced Encryption Standard (AES). Because of the strength of these algorithms to protect sensitive data, they are used now by U.S. Government agencies, but it is anticipated by those in the art that one or more of these algorithms will become the standard for commercial and private transactions in the near future. According to all of these symmetric key algorithms, plaintext and ciphertext is divided into blocks of a specified size for encryption and decryption. For example, AES performs cryptographic operations on blocks 128 bits in size, and uses cryptographic key sizes of 128-, 192-, and 256-bits. Other symmetric key algorithms such as the Rijndael Cipher allow for 192- and 256-bit data blocks as well. Accordingly, for a block encryption operation, a 1024-bit plaintext message is encrypted as eight 128-bit blocks.

All of the symmetric key algorithms utilize the same type of sub-operations to encrypt a block of plaintext. And according to many of the more commonly employed symmetric key algorithms, an initial cryptographic key is expanded into a plurality of keys (i.e., a "key schedule"), each of which is employed as a corresponding cryptographic "round" of sub-operations is performed on the block of plaintext. For instance, a first key from the key schedule is used to perform a first cryptographic round of sub-operations on the block of plaintext. The result of the first round is used as input to a second round, where the second round employs a second key from the key schedule to produce a second result. And a specified number of subsequent rounds are performed to yield a final round result which is the ciphertext itself. According to the AES algorithm, the sub-operations within each round are referred to in the literature as SubBytes (or S-box), ShiftRows, MixColums, and AddRoundKey. Decryption of a block of ciphertext is similarly accomplished with the exceptions that the ciphertext is the input to the inverse cipher and inverse sub-operations are performed (e.g., Inverse MixColumns, Inverse ShiftRows) during each of the rounds, and the final result of the rounds is a block of plaintext.

DES and Triple-DES utilize different specific sub-operations, but the sub-operations are analogous to those of AES because they are employed in a similar fashion to transform a block of plaintext into a block of ciphertext.

To perform cryptographic operations on multiple successive blocks of text, all of the symmetric key algorithms employ the same types of modes. These modes include electronic code book (ECB) mode, cipher block chaining (CBC) mode, cipher feedback (CFB) mode, and output feedback (OFB) mode. Some of these modes utilize an additional initialization vector during performance of the sub-operations and some use the ciphertext output of a first set of cryptographic rounds performed on a first block of plaintext as an additional input to a second set of cryptographic rounds performed on a second block of plaintext. It is beyond the scope of the present application to provide an in depth discussion of each of the cryptographic algorithms and sub-operations employed by present day symmetric key cryptographic algorithms. For specific implementation standards, the reader is directed to *Federal Information Processing Standards Publication* 46-3 (FIPS-46-3), dated Oct. 25, 1999 for a detailed discussion of DES and Triple DES, and *Federal Information Processing Standards Publication* 197 (FIPS-197), dated Nov. 26, 2001 for a detailed discussion of AES. Both of the aforementioned standards are issued and maintained by the National Institute of Standards and Technology (NIST) and are herein incorporated by reference for all intents and purposes. In addition to the aforementioned standards, tutorials, white papers, toolkits, and resource articles can be obtained from NIST's Computer Security Resource Center (CSRC) over the Internet at http://csrc.nist.gov/.

One skilled in the art will appreciate that there are numerous application programs available for execution on a computer system that can perform cryptographic operations (i.e., encryption and decryption). In fact, some operating systems (e.g. Microsoft® WindowsXP®, Linux) provide direct encryption/decryption services in the form of cryptographic primitives, cryptographic application program interfaces, and the like. The present inventors, however, have observed that present day computer cryptography techniques are deficient in several respects. Thus, the reader's attention is directed to FIG. 1, whereby these deficiencies are highlighted and discussed below.

FIG. 1 is a block diagram 100 illustrating present day computer cryptography applications. The block diagram 100 depicts a first computer workstation 101 connected to a local area network 105. Also connected to the network 105 is a second computer workstation 102, a network file storage device 106, a first router 107 or other form of interface to a wide area network (WAN) 110 such as the Internet, and a wireless network router 108 such as one of those compliant with IEEE Standard 802.11. A laptop computer 104 interfaces to the wireless router 108 over a wireless network 109. At another point on the wide area network 110, a second router 111 provides interface for a third computer workstation 103.

As alluded to above, a present day user is confronted with the issue of computer information security many times during a work session. For example, under the control of a present day multi-tasking operating system, a user of workstation 101 can be performing several simultaneous tasks, each of which require cryptographic operations. The user of workstation 101 is required to run an encryption/decryption application 112 (either provided as part of the operating system or invoked by the operating system) to store a local file on the network file storage device 106. Concurrent with the file storage, the user can transmit an encrypted message to a second user at workstation 102, which also requires executing an instance of the encryption/decryption application 112. The encrypted message may be real-time (e.g., an instant message) or non-real-time (i.e. email). In addition, the user can be accessing or providing his/her financial data (e.g., credit card numbers, financial transactions, etc.) or other forms of sensitive data over the WAN 110 from workstation 103. Workstation 103 could also represent a home office or other remote computer 103 that the user of workstation 101 employs when out of the office to access any of the shared resources 101, 102, 106 107, 108, 109 on local area network 105. Each of these aforementioned activities requires that a corresponding instance of the encryption/decryption application 112 be invoked. Furthermore, wireless networks 109 are now being routinely provided in coffee shops, airports, schools, and other public venues, thus prompting a need for a user of laptop 104 to encrypt/decrypt not only his/her messages to/from other users, but to encrypt and decrypt all communications over the wireless network 109 to the wireless router 108.

One skilled in the art will therefore appreciate that along with each activity that requires cryptographic operations at a given workstation 101-104, there is a corresponding requirement to invoke an instance of the encryption/decryption application 112. Hence, a computer 101-104 in the near future could potentially be performing hundreds of concurrent cryptographic operations.

The present inventors have noted several limitations to the above approach of performing cryptographic operations by invoking one or more instances of an encryption/decryption application 112 on a computing system 101-104. For example, performing a prescribed function via programmed software is exceedingly slow compared to performing that same function via dedicated hardware. Each time the encryption/decryption application 112 is required, a current task executing on a computer 101-104 must be suspended from execution, and parameters of the cryptographic operation (i.e., plaintext, ciphertext, mode, key, etc.) must be passed through the operating system to the instance of the encryption/decryption application 112, which is invoked for accomplishment of the cryptographic operation. And because cryptographic algorithms necessarily involve many rounds of sub-operations on a particular block of data, execution of the encryption/decryption applications 112 involves the execution of numerous computer instructions to the extent that overall system processing speed is disadvantageously affected. One skilled in the art will appreciate that sending a small encrypted email message in Microsoft® Outlook® can take up to five times as long as sending an unencrypted email message.

In addition, current techniques are limited because of the delays associated with operating system intervention. Most application programs do not provide integral key generation or encryption/decryption components; they employ components of the operating system or plug-in applications to accomplish these tasks. And operating systems are otherwise distracted by interrupts and the demands of other currently executing application programs.

Furthermore, the present inventors have noted that the accomplishment of cryptographic operations on a present day computer system 101-104 is very much analogous to the accomplishment of floating point mathematical operations prior to the advent of dedicated floating point units within microprocessors. Early floating point operations were performed via software and hence, they executed very slowly. Like floating point operations, cryptographic operations performed via software are disagreeably slow. As floating point technology evolved further, floating point instructions were provided for execution on floating point co-processors. These floating point co-processors executed floating point operations much faster than software implementations, yet they added cost to a system. Likewise, cryptographic co-processors exist today in the form of add-on boards or external devices that interface to a host processor via parallel ports or other interface buses (e.g., USB). These co-processors certainly enable the accomplishment of cryptographic operations much faster than pure software implementations. But cryptographic co-processors add cost to a system configuration, require extra power, and decrease the overall reliability of a system. Cryptographic co-processor implementations are additionally vulnerable to snooping because the data channel is not on the same die as the host microprocessor.

Therefore, the present inventors recognize a need for dedicated cryptographic hardware within a present day microprocessor such that an application program that requires a cryptographic operation can direct the microprocessor to perform the cryptographic operation via a single, atomic, cryptographic instruction. The present inventors also recognize that such a capability should be provided so as to limit requirements for operating system intervention and management. Also, it is desirable that the cryptographic instruction be available for use at an application program's privilege level and that the dedicated cryptographic hardware comport with prevailing architectures of present day microprocessors. There is also a need to provide the cryptographic hardware and associated cryptographic instruction in a manner that supports compatibility with legacy operating systems and applications. It is moreover desirable to provide an apparatus and method for performing cryptographic operations that is resistant to unauthorized observation, that can support multiple cryptographic algorithms, that supports verification and testing of the particular cryptographic algorithm that is embodied thereon, that allows for user-provided keys as well as self-generated keys, that supports multiple data block sizes and key sizes, that provides for programmable block encryption/decryption modes such as ECB, CBC, CFB, and OFB, and that the execution of block cipher cryptographic functions that employ any of the aforementioned programmable block encryption/decryption modes be efficiently performed across multiple data blocks.

SUMMARY OF THE INVENTION

The present invention, among other applications, is directed to solving these and other problems and disadvantages of the prior art. The present invention provides a superior technique for performing cryptographic operations within a pipeline microprocessor. In one embodiment, an apparatus in a pipeline microprocessor is provided for accomplishing cryptographic operations. The apparatus includes a cryptographic instruction, OFB mode logic, execution logic, and a bit. The cryptographic instruction is received by a pipeline microprocessor as part of an application program executing on the pipeline microprocessor. The cryptographic instruction is prescribed according to the x86 instruction format and prescribes one of the cryptographic operations. The one of the cryptographic operations includes a plurality of OFB block cryptographic operations performed on a corresponding plurality of input text blocks. The OFB mode logic is operatively coupled to the cryptographic instruction. The OFB mode logic directs the pipeline microprocessor to update pointer registers and an initialization vector location for each of the plurality of OFB block cryptographic operations. The execution logic is operatively coupled to the OFB mode logic. The execution logic executes the one of the cryptographic operations. The bit is coupled to the execution logic, and is configured to indicate whether the one of the cryptographic operations has been interrupted by an interrupting event.

One aspect of the present invention contemplates a apparatus for performing cryptographic operations. The apparatus includes a cryptography unit within a pipeline microprocessor, OFB mode logic, and a bit. The cryptography unit executes one of the cryptographic operations responsive to receipt of a cryptographic instruction within an application program that prescribes the one of the cryptographic operations. The cryptographic instruction is prescribed according to the x86 instruction format. The one of the cryptographic operations includes a plurality of CFB block cryptographic operations performed on a corresponding plurality of input text blocks. The OFB mode logic is operatively coupled to the cryptography unit. The OFB mode logic directs the pipeline microprocessor to update pointer registers and an initialization vector location for each of the plurality of OFB block cryptographic operations. The bit is coupled to the cryptography unit, and is configured to indicate whether the one of the cryptographic operations has been interrupted by an interrupting event.

Another aspect of the present invention comprehends a method for performing cryptographic operations in a pipeline microprocessor. The method includes executing one of the cryptographic operations responsive to receiving a cryptographic instruction, wherein the cryptographic instruction is prescribed according to the x86 instruction format, and wherein the cryptographic instruction prescribes the one of the cryptographic operations. The executing includes performing a plurality of OFB mode block operations on a corresponding plurality of input text blocks, and indicating whether the one of the cryptographic operations has been interrupted by an interrupting event. The method also includes writing an initialization vector equivalent to an initialization vector location for employment by a following one of the plurality of OFB mode block operations on a following one of the plurality of input text blocks.

BRIEF DESCRIPTION OF THE DRAWINGS

These and other objects, features, and advantages of the present invention will become better understood with regard to the following description, and accompanying drawings where:

FIG. 7 is a diagram illustrating fields within an exemplary micro instruction for directing cryptographic sub-operations within the microprocessor of FIG. 6;

FIG. 8 is a table depicting values of the register field for an XLOAD micro instruction according to the format of FIG. 7;

FIG. 9 is a table showing values of the register field for an XSTOR micro instruction according to the format of FIG. 7;

DETAILED DESCRIPTION

The following description is presented to enable one of ordinary skill in the art to make and use the present invention as provided within the context of a particular application and its requirements. Various modifications to the preferred embodiment will, however, be apparent to one skilled in the art, and the general principles defined herein may be applied to other embodiments. Therefore, the present invention is not intended to be limited to the particular embodiments shown and described herein, but is to be accorded the widest scope consistent with the principles and novel features herein disclosed.

Figure 1:
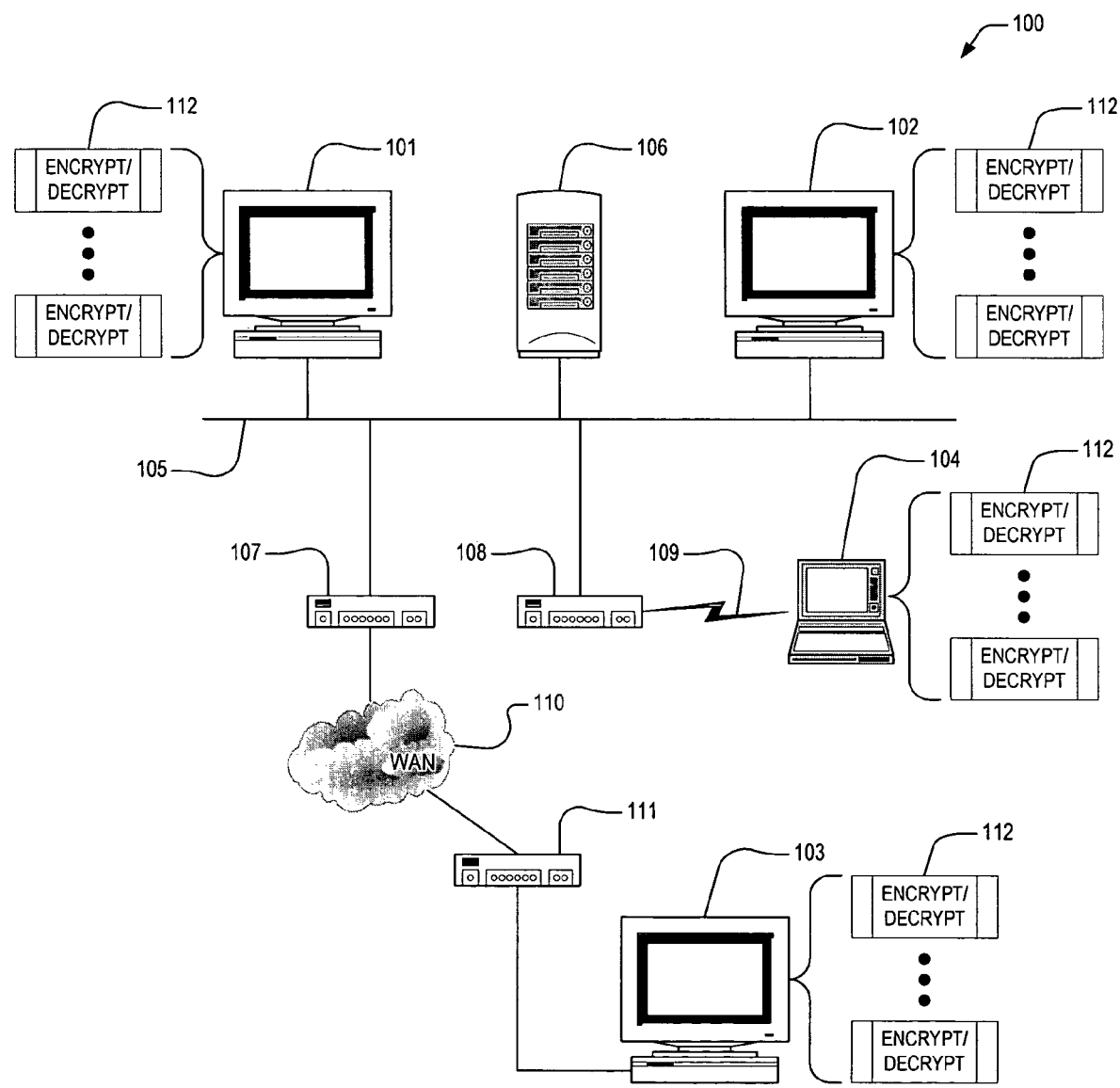
FIG. 1 is a block diagram illustrating present day cryptography applications.
Figure 2:
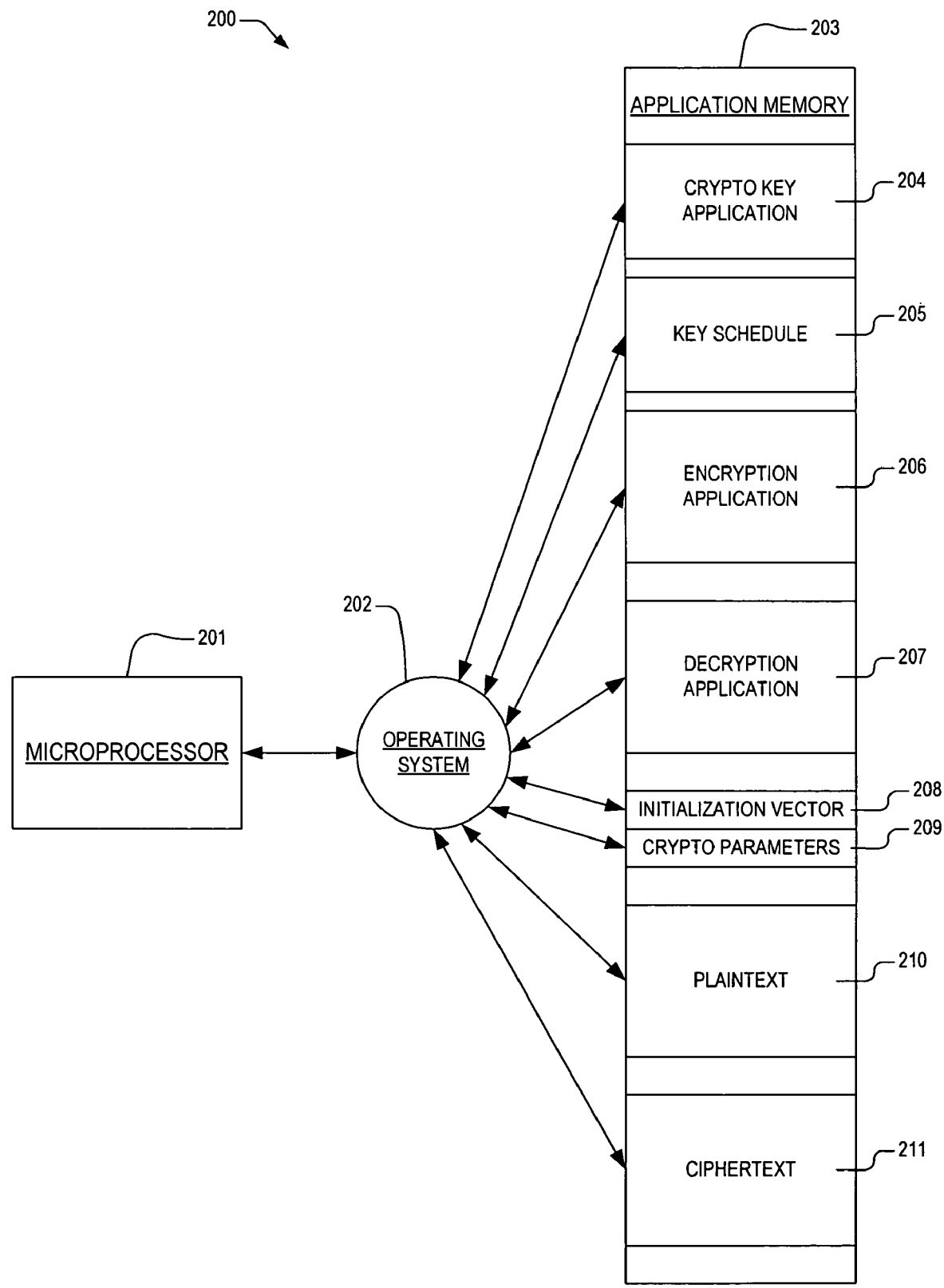
FIG. 2 is a block diagram depicting techniques for performing cryptographic operations.

In view of the above background discussion on cryptographic operations and associated techniques employed within present day computer systems to encrypt and decrypt data, the discussion of these techniques and their limitations will now be continued with reference to FIG. 2. Following this, the present invention will be discussed with reference to FIGS. 3-14. The present invention provides an apparatus and method for performing cryptographic operations in a present day computer system that exhibits superior performance characteristics over prevailing mechanisms and furthermore satisfies the above noted goals of limiting operating system intervention, atomicity, legacy and architectural compatibility, algorithmic and mode programmability, hack resistance, and testability.

Now turning to FIG. 2, a block diagram 200 is presented depicting techniques for performing cryptographic operations in a present day computer system as discussed above. The block diagram 200 includes a microprocessor 201 that fetches instructions and accesses data associated with an application program from an area of system memory called application memory 203. Program control and access of data within the application memory 203 is generally managed by operating system software 202 that resides in a protected area of system memory. As discussed above, if an executing application program (e.g., an email program or a file storage program) requires that a cryptographic operation be performed, the executing application program must accomplish the cryptographic operation by directing the microprocessor 201 to execute a significant number of instructions. These instructions may be subroutines that are part of the executing application program itself, they may be plug-in applications that are linked to the execution application program, or they may be services that are provided by the operating system 202. Regardless of their association, one skilled in the art will appreciate that the instructions will reside in some designated or allocated area of memory. For purposes of discussion, these areas of memory are shown within the application memory 203 and comprise a cryptographic key generation application 204 that typically generates or accepts a cryptographic key and expands the key into a key schedule 205 for use in cryptographic round operations. For a multi-block encryption operation, a block encryption application 206 is invoked. The encryption application 206 executes instructions that access blocks of plaintext 210, the key schedule 205, cryptographic parameters 209 that further specify particulars of the encryption operation such as mode, location of the key schedule, etc. If required by specified mode, an initialization vector 208 is also accessed by the encryption application 206. The encryption application 206 executes the instructions therein to generate corresponding blocks of ciphertext 211. Similarly, a block decryption application 207 is invoked for performing block decryption operations. The decryption application 207 executes instructions that access blocks of ciphertext 211, the key schedule 205, cryptographic parameters 209 that further specify particulars of the block decryption operation and, if mode requires, an initialization vector 208 is also accessed. The decryption application 207 executes the instructions therein to generate corresponding blocks of plaintext 210.

It is noteworthy that a significant number of instructions must be executed in order to generate cryptographic keys and to encrypt or decrypt blocks of text. The aforementioned FIPS specifications contain many examples of pseudo code enabling the approximate number of instructions that are required to be estimated, therefore, one skilled in the art will appreciate that hundreds of instructions are required to accomplish a simple block encryption operation. And each of these instructions must be executed by the microprocessor 201 in order to accomplish the requested cryptographic operation. Furthermore, the execution of instructions to perform a cryptographic operation is generally seen as superfluous to the primary purposes (e.g., file management, instant messaging, email, remote file access, credit card transaction) of a currently executing application program. Consequently, a user of the currently executing application program senses that the currently executing application is performing inefficiently. In the case of stand-alone or plug-in encryption and decryption applications 206, 207, invocation and management of these applications 206, 207 must also be subject to the other demands of the operating system 202 such as supporting interrupts, exceptions, and like events that further exacerbate the problem. Moreover, for every concurrent cryptographic operation that is required on a computer system, a separate instance of the applications 204, 206, 207 must be allocated in memory 203. And, as noted above, it is anticipated that the number of concurrent cryptographic operations required to be performed by a microprocessor 201 will continue to increase with time.

The present inventors have noted the problems and limitations of current computer system cryptographic techniques and furthermore recognize a need to provide apparatus and methods for performing cryptographic operations in a microprocessor which do not exhibit disadvantageous program delays to users. Accordingly, the present invention provides a microprocessor apparatus and associated methodology for performing cryptographic operations via a dedicated cryptographic unit therein. The cryptographic unit is activated to perform cryptographic operations via programming of a single cryptographic instruction. The present invention will now be discussed with reference to FIGS. 3-12.

Figure 3:
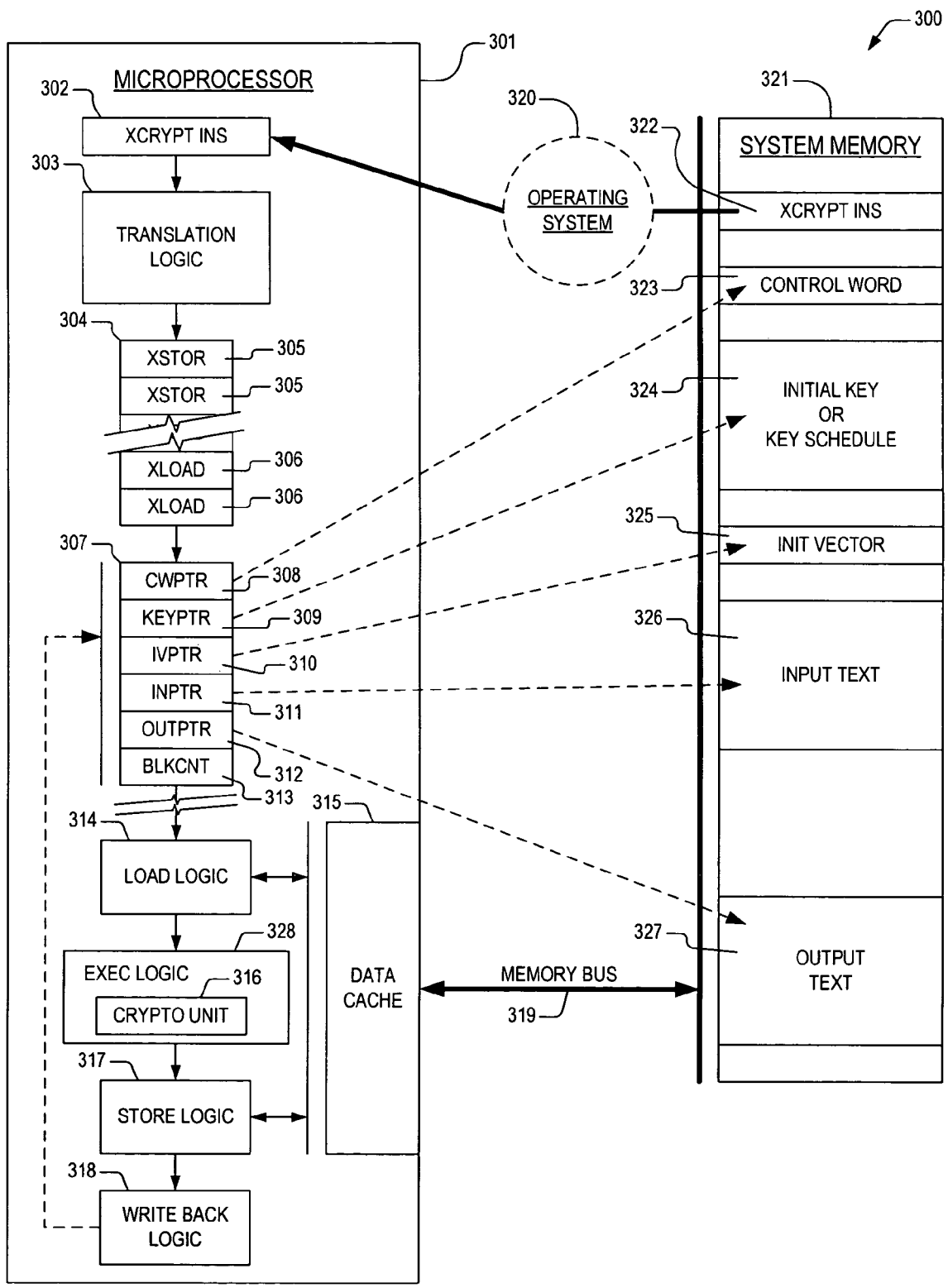
FIG. 3 is a block diagram featuring a microprocessor apparatus according to the present invention for performing cryptographic operations.

Referring to FIG. 3, a block diagram 300 is provided featuring a microprocessor apparatus according to the present invention for performing cryptographic operations. The block diagram 300 depicts a microprocessor 301 that is coupled to a system memory 321 via a memory bus 319. The microprocessor 301 includes translation logic 303 that receives instructions from an instruction register 302. The translation logic 303 comprises logic, circuits, devices, or microcode (i.e., micro instructions or native instructions), or a combination of logic, circuits, devices, or microcode, or equivalent elements that are employed to translate instructions into associated sequences of micro instructions. The elements employed to perform translation within the translation logic 303 may be shared with other circuits, microcode, etc., that are employed to perform other functions within the microprocessor 301. According to the scope of the present application, microcode is a term employed to refer to a plurality of micro instructions. A micro instruction (also referred to as a native instruction) is an instruction at the level that a unit executes. For example, micro instructions are directly executed by a reduced instruction set computer (RISC) microprocessor. For a complex instruction set computer (CISC) microprocessor such as an x86-compatible microprocessor, x86 instructions are translated into associated micro instructions, and the associated micro instructions are directly executed by a unit or units within the CISC microprocessor. The translation logic 303 is coupled to a micro instruction queue 304. The micro instruction queue 304 has a plurality of micro instruction entries 305, 306. Micro instructions are provided from the micro instruction queue 304 to register stage logic that includes a register file 307. The register file 307 has a plurality of registers 308-313 whose contents are established prior to performing a prescribed cryptographic operation. Registers 308-312 point to corresponding locations 323-327 in memory 321 that contain data which is required to perform the prescribed cryptographic operation. The register stage is coupled to load logic 314, which interfaces to a data cache 315 for retrieval of data for performance of the prescribed cryptographic operation. The data cache 315 is coupled to the memory 321 via the memory bus 319. Execution logic 328 is coupled to the load logic 314 and executes the operations prescribed by micro instructions as passed down from previous stages. The execution logic 328 comprises logic, circuits, devices, or microcode (i.e., micro instructions or native instructions), or a combination of logic, circuits, devices, or microcode, or equivalent elements that are employed to perform operations as prescribed by instructions provided thereto. The elements employed to perform the operations within the execution logic 328 may be shared with other circuits, microcode, etc., that are employed to perform other functions within the microprocessor 301. The execution logic 328 includes a cryptography unit 316. The cryptography unit 316 receives data required to perform the prescribed cryptographic operation from the load logic 314. Micro instructions direct the cryptography unit 316 to perform the prescribed cryptographic operation on a plurality of blocks of input text 326 to generate a corresponding plurality of blocks of output text 327. The cryptography unit 316 comprises logic, circuits, devices, or microcode (i.e., micro instructions or native instructions), or a combination of logic, circuits, devices, or microcode, or equivalent elements that are employed to perform cryptographic operations. The elements employed to perform the cryptographic operations within the cryptography unit 316 may be shared with other circuits, microcode, etc., that are employed to perform other functions within the microprocessor 301. In one embodiment, the cryptography unit 316 operates in parallel to other execution units (not shown) within the execution logic 328 such as an integer unit, floating point unit, etc. One embodiment of a "unit" within the scope of the present application comprises logic, circuits, devices, or microcode (i.e., micro instructions or native instructions), or a combination of logic, circuits, devices, or microcode, or equivalent elements that are employed to perform specified functions or specified operations. The elements employed to perform the specified functions or specified operations within a particular unit may be shared with other circuits, microcode, etc., that are employed to perform other functions or operations within the microprocessor 301. For example, in one embodiment, an integer unit comprises logic, circuits, devices, or microcode (i.e., micro instructions or native instructions), or a combination of logic, circuits, devices, or microcode, or equivalent elements that are employed to execute integer instructions. A floating point unit comprises logic, circuits, devices, or microcode (i.e., micro instructions or native instructions), or a combination of logic, circuits, devices, or microcode, or equivalent elements that are employed to execute floating point instructions. The elements employed execute integer instructions within the integer unit may be shared with other circuits, microcode, etc., that are employed to execute floating point instructions within the floating point unit. In one embodiment that is compatible with the x86 architecture, the cryptography unit 316 operates in parallel with an x86 integer unit, an x86 floating point unit, an x86 MMX® unit, and an x86 SSE® unit. According to the scope of the present application, an embodiment is compatible with the x86 architecture if the embodiment can correctly execute a majority of the application programs that are designed to be executed on an x86 microprocessor. An application program is correctly executed if its expected results are obtained. Alternative x86-compatible embodiments contemplate the cryptography unit operating in parallel with a subset of the aforementioned x86 execution units. The cryptography unit 316 is coupled to store logic 317 and provides the corresponding plurality of blocks of output text 327. The store logic 317 is also coupled to the data cache 315, which routes the output text data 327 to system memory 321 for storage. The store logic 317 is coupled to write back logic 318. The write back logic 318 updates registers 308-313 within the register file 307 as the prescribed cryptographic operation is accomplished. In one embodiment, micro instructions flow through each of the aforementioned logic stages 302, 303, 304, 307, 314, 316-318 in synchronization with a clock signal (not shown) so that operations can be concurrently executed in a manner substantially similar to operations performed on an assembly line.

Within the system memory 321, an application program that requires the prescribed cryptographic operation can direct the microprocessor 301 to perform the operation via a single cryptographic instruction 322, referred to herein for instructive purposes as an XCRYPT instruction 322. In a CISC embodiment, the XCRYPT instruction 322 comprises an instruction that prescribes a cryptographic operation. In a RISC embodiment, the XCRYPT instruction 322 comprises a micro instruction that prescribes a cryptographic operation. In one embodiment, the XCRYPT instruction 322 utilizes a spare or otherwise unused instruction opcode within an existing instruction set architecture. In one x86-compatible embodiment, the XCRYPT instruction 322 is a 4-byte instruction comprising an x86 REP prefix (i.e., 0xF3), followed by unused x86 2-byte opcode (e.g., 0x0FA7), followed a byte detailing a specific block cipher mode to be employed during execution of a prescribed cryptographic operation. In one embodiment, the XCRPYT instruction 322 according to the present invention can be executed at the level of system privileges afforded to application programs and can thus be programmed into a program flow of instructions that are provided to the microprocessor 301 either directly by an application program or under control of an operating system 320. Since there is only one instruction 322 that is required to direct the microprocessor 301 to perform the prescribed cryptographic operation, it is contemplated that accomplishment of the operation is entirely transparent to the operating system 320.

In operation, the operating system 320 invokes an application program to execute on the microprocessor 301. As part of the flow of instructions during execution of the application program, an XCRYPT instruction 322 is provided from memory 321 to the fetch logic 302. Prior to execution of the XCRYPT instruction 322, however, instructions within the program flow direct the microprocessor 301 to initialize the contents of registers 308-312 so that they point to locations 323-327 in memory 321 that contain a cryptographic control word 323, an initial cryptographic key 324 or a key schedule 324, an initialization vector 325 (if required), input text 326 for the operation, and output text 327. It is required to initialize the registers 308-312 prior to executing the XCRYPT instruction 322 because the XCRYPT instruction 322 implicitly references the registers 308-312 along with an additional register 313 that contains a block count, that is the number of blocks of data within the input text area 326 to be encrypted or decrypted. Thus, the translation logic 303 retrieves the XCRYPT instruction from the fetch logic 302 and translates it into a corresponding sequence of micro instructions that directs the microprocessor 301 to perform the prescribed cryptographic operation. A first plurality of micro instructions 305-306 within the corresponding sequence of micro instructions specifically directs the cryptography unit 316 to load data provided from the load logic 314 and to begin execution of a prescribed number of cryptographic rounds to generate a corresponding block of output data and to provide the corresponding block of output data to the store logic 317 for storage in the output text area 327 of memory 321 via the data cache 315. A second plurality of micro instructions (not shown) within the corresponding sequence of micro instructions directs other execution units (not shown) within the microprocessor 301 to perform other operations necessary to accomplish the prescribed cryptographic operation such as management of non-architectural registers (not shown) that contain temporary results and counters, update of input and output pointer registers 311-312, update of the initialization vector pointer register 310 (if required) following encryption/decryption of a block of input text 326, processing of pending interrupts, etc. In one embodiment, registers 308-313 are architectural registers. An architectural register 308-313 is a register that is defined within the instruction set architecture (ISA) for the particular microprocessor that is implemented.

In one embodiment, the cryptography unit 316 is divided into a plurality of stages thus allowing for pipelining of successive input text blocks 326.

The block diagram 300 of FIG. 3 is provided to teach the necessary elements of the present invention and thus, much of the logic within a present day microprocessor 301 has been omitted from the block diagram 300 for clarity purposes. One skilled in the art will appreciate, however, that a present day microprocessor 301 comprises many stages and logic elements according to specific implementation, some of which have been aggregated herein for clarity purposes. For instance, the load logic 314 could embody an address generation stage followed by a cache interface stage, following by a cache line alignment stage. What is important to note, however, is that a complete cryptographic operation on a plurality of blocks of input text 326 is directed according to the present invention via a single instruction 322 whose operation is otherwise transparent to considerations of the operating system 320 and whose execution is accomplished via a dedicated cryptography unit 316 that operates in parallel with and in concert with other execution units within the microprocessor 301. The present inventors contemplate provision of alternative embodiments of the cryptography unit 316 in embodiment configurations that are analogous to provision of dedicated floating point unit hardware within a microprocessor in former years. Operation of the cryptography unit 316 and associated XCRPYT instruction 322 is entirely compatible with the concurrent operation of legacy operating systems 320 and applications, as will be described in more detail below.

Figures 4, 5:
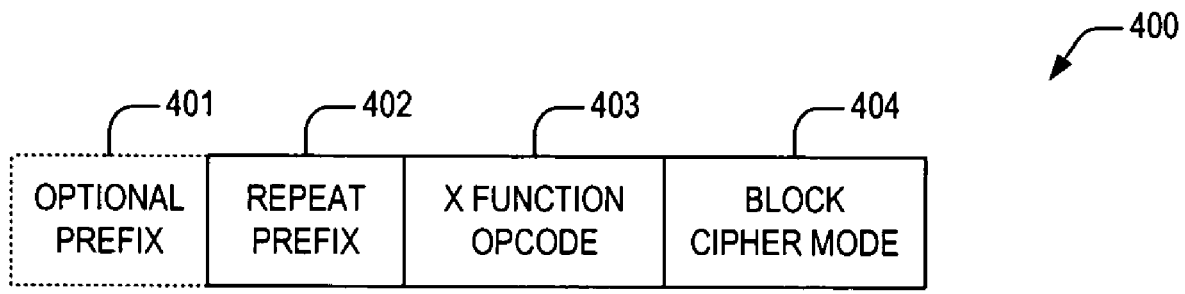
FIG. 4 is a block diagram showing one embodiment of an atomic cryptographic instruction according to the present invention.
FIG. 5 is a table illustrating exemplary block cipher mode field values according to the atomic cryptographic instruction of FIG. 4.

Now referring to FIG. 4, a block diagram is provided showing one embodiment of an atomic cryptographic instruction 400 according to the present invention. The cryptographic instruction 400 includes an optional prefix field 401, which is followed by a repeat prefix field 402, which is followed by an opcode field 403, which is followed by a block cipher mode field 404. In one embodiment, contents of the fields 401-404 comport with the x86 instruction set architecture. Alternative embodiments contemplate compatibility with other instruction set architectures.

Operationally, the optional prefix 401 is employed in many instruction set architectures to enable or disable certain processing features of a host microprocessor such as directing 16-bit or 32-bit operations, directing processing or access to specific memory segments, etc. The repeat prefix 402 indicates that the cryptographic operation prescribed by the cryptographic instruction 400 is to be accomplished on a plurality of blocks of input data (i.e., plaintext or ciphertext). The repeat prefix 402 also implicitly directs a comporting microprocessor to employ the contents of a plurality of architectural registers therein as pointers to locations in system memory that contain cryptographic data and parameters needed to accomplish the specified cryptographic operation. As noted above, in an x86-compatible embodiment, the value of the repeat prefix 402 is 0xF3. And, according to x86 architectural protocol, the cryptographic instruction is very similar in form to an x86 repeat string instruction such as REP.MOVS. For example, when executed by an x86-compatible microprocessor embodiment of the present invention, the repeat prefix implicitly references a block count variable that is stored in architectural register ECX, a source address pointer (pointing to the input data for the cryptographic operation) that is stored in register ESI, and a destination address pointer (pointing to the output data area in memory) that is stored in register EDI. In an x86-compatible embodiment, the present invention further extends the conventional repeat-string instruction concept to further reference a control word pointer that is stored in register EDX, a cryptographic key pointer that is stored in register EBX, and a pointer to an initialization vector (if required by prescribed cipher mode) that is stored in register EAX.

The opcode field 403 prescribes that the microprocessor accomplish a cryptographic operation as further specified within a control word stored in memory that is implicitly referenced via the control word pointer. The present invention contemplates preferred choice of the opcode value 403 as one of the spare or unused opcode values within an existing instruction set architecture so as to preserve compatibility within a conforming microprocessor with legacy operating system and application software. For example, as noted above, an x86-compatible embodiment of the opcode field 403 employs value 0x0FA7 to direct execution of the specified cryptographic operation. The block cipher mode field 404 prescribes the particular block cipher mode to be employed during the specified cryptographic operation, as will now be discussed with reference to FIG. 5.

FIG. 5 is a table 500 illustrating exemplary block cipher mode field values according to the atomic cryptographic instruction of FIG. 4. Value 0xC8 prescribes that the cryptographic operation be accomplished using electronic code book (ECB) mode. Value 0xD0 prescribes that the cryptographic operation be accomplished using cipher block chaining (CBC) mode. Value 0xE0 prescribes that the cryptographic operation be accomplished using cipher feedback (CFB) mode. And value 0xE8 prescribes that the cryptographic operation be accomplished using output feedback (OFB) mode. All other values of the block cipher mode field 404 are reserved. These modes are described in the aforementioned FIPS documents.

Figure 6:
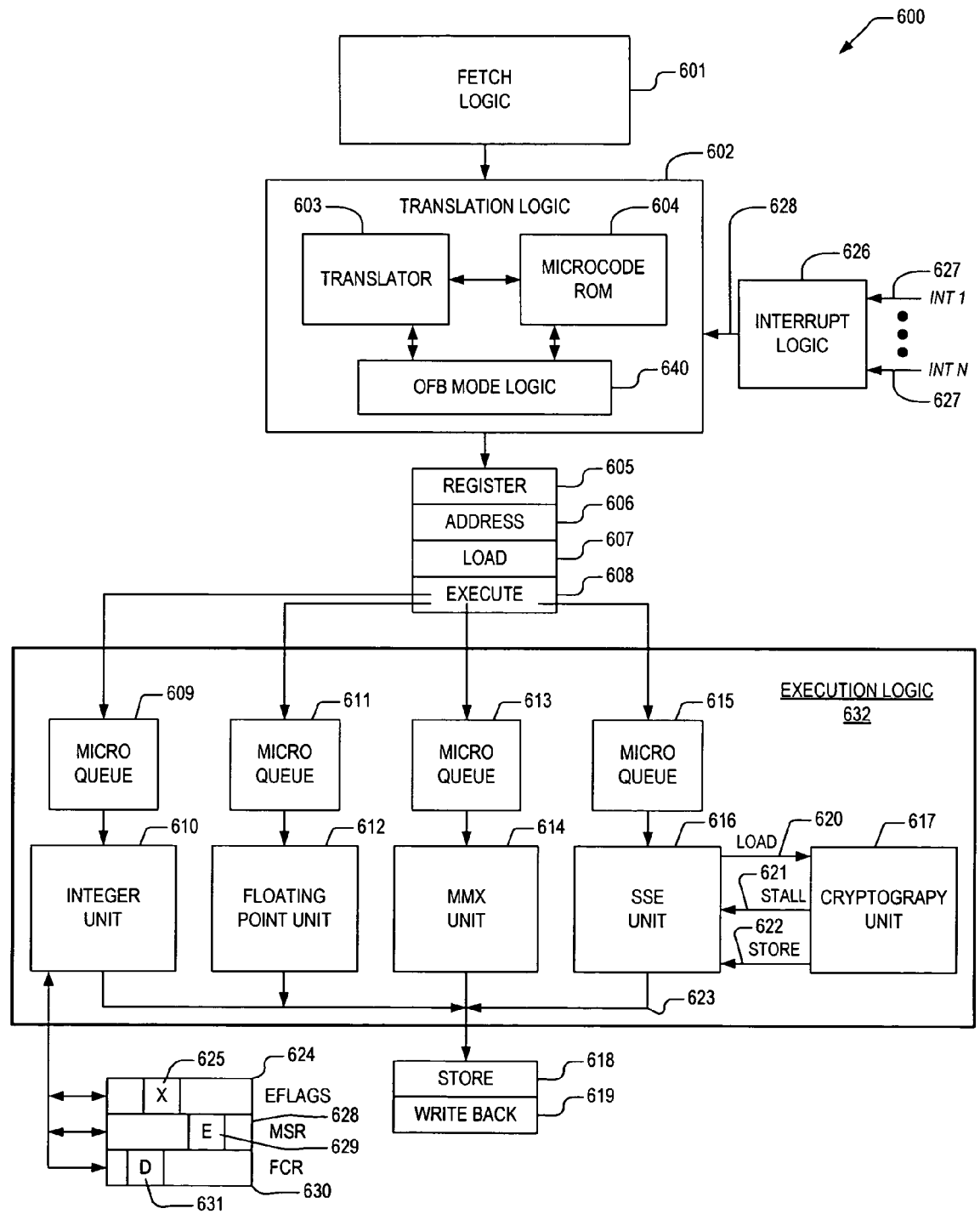
FIG. 6 is a block diagram detailing a cryptography unit within an x86-compatible microprocessor according to the present invention.

Now turning to FIG. 6, a block diagram is presented detailing a cryptography unit 617 within an x86-compatible microprocessor 600 according to the present invention. The microprocessor 600 includes fetch logic 601 that fetches instructions from memory (not shown) for execution. The fetch logic 601 is coupled to translation logic 602. The translation logic 602 comprises logic, circuits, devices, or microcode (i.e., micro instructions or native instructions), or a combination of logic, circuits, devices, or microcode, or equivalent elements that are employed to translate instructions into associated sequences of micro instructions. The elements employed to perform translation within the translation logic 602 may be shared with other circuits, microcode, etc., that are employed to perform other functions within the microprocessor 600. The translation logic 602 includes a translator 603 that is coupled to a microcode ROM 604, and output feedback (OFB) mode logic 640 that is coupled to both the translator 603 and the microcode ROM 604. Interrupt logic 626 couples to the translation logic 602 via bus 628. A plurality of software and hardware interrupt signals 627 are processed by the interrupt logic 626 which indicates pending interrupts to the translation logic 602. The translation logic 602 is coupled to successive stages of the microprocessor 600 including a register stage 605, address stage 606, load stage 607, execute stage 608, store stage 618, and write back stage 619. Each of the successive stages include logic to accomplish particular functions related to the execution of instructions that are provided by the fetch logic 601 as has been previously discussed with reference to like-named elements in the microprocessor of FIG. 3. The x86-compatible embodiment 600 depicted in FIG. 6 features execution logic 632 within the execute stage 608 that includes parallel execution units 610, 612, 614, 616, 617. An integer unit 610 receives integer micro instructions for execution from micro instruction queue 609. A floating point unit 612 receives floating point micro instructions for execution from micro instruction queue 611. An MMX® unit 614 receives MMX micro instructions for execution from micro instruction queue 613. An SSE® unit 616 receives SSE micro instructions for execution from micro instruction queue 615. In the exemplary x86 embodiment shown, a cryptography unit 617 is coupled to the SSE unit 616 via a load bus 620, a stall signal 621, and a store bus 622. The cryptography unit 617 shares the SSE unit's micro instruction queue 615. An alternative embodiment contemplates stand-alone parallel operation of the cryptography unit 617 in a manner like that of units 610, 612, and 614. The integer unit 610 is coupled an x86 EFLAGS register 624. The EFLAGS register includes an X bit 625 whose state is set to indicate whether or not cryptographic operations are currently in process. In one embodiment the X bit 625 is bit 30 of an x86 ELFAGS register 624. In addition, the integer unit 610 access a machine specific register 628 to evaluate the state of an E bit 629. The state of the E bit 629 indicates whether or not the cryptography unit 617 is present within the microprocessor 600. The integer unit 610 also accesses a D bit 631 in a feature control register 630 to enable or disable the cryptography unit 617. As with the microprocessor embodiment 301 of FIG. 3, the microprocessor 600 of FIG. 6 features elements essential to teach the present invention in the context of an x86-compatible embodiment and for clarity aggregates or omits other elements of the microprocessor. One skilled in the art will appreciate that other elements are required to complete the interface such as a data cache (not shown), bus interface unit (not shown), clock generation and distribution logic (not shown), etc.

In operation, instructions are fetched from memory (not shown) by the fetch logic 601 and are provided in synchronization with a clock signal (not shown) to the translation logic 602. The translation logic 602 translates each instruction into a corresponding sequence of micro instructions that are sequentially provided in synchronization with the clock signal to subsequent stages 605-608, 618, 619 of the microprocessor 600. Each micro instruction within a sequence of micro instructions directs execution of a sub-operation that is required to accomplish an overall operation that is prescribed by a corresponding instruction such as generation of an address by the address stage 606, addition of two operands within the integer unit 610 which have been retrieved from prescribed registers (not shown) within the register stage 605, storage of a result generated by one of the execution units 610, 612, 614, 616, 617 in memory by the store logic 618, etc. Depending upon the instruction that is being translated, the translation logic 602 will employ the translator 603 to directly generate the sequence of micro instructions, or it will fetch the sequence from the microcode ROM 604, or it will employ the translator 603 to directly generate a portion of the sequence and fetch the remaining portion of the sequence from the microcode ROM 604. The micro instructions proceed sequentially through the successive stages 605-608, 618, 619 of the microprocessor 600 in synchronization with the clock. As micro instructions reach the execute stage 608, they are routed by the execution logic 632 along with their operands (retrieved from registers within the register stage 605, or generated by logic within the address stage 606, or retrieved from a data cache by the load logic 607) to a designated execution unit 610, 612, 614, 616, 617 by placing the micro instructions in a corresponding micro instruction queue 609, 611, 613, 615. The execution units 610, 612, 614, 616, 617 execute the micro instructions and provide results to the store stage 618. In one embodiment, the micro instructions include fields indicating whether or not they can be executed in parallel with other operations.

Responsive to fetching an XCRYPT instruction as described above, the translation logic 602 generates associated micro instructions that direct logic within subsequent stages 605-608, 618, 619 of the microprocessor 600 to perform the prescribed cryptographic operation. A first plurality of the associated micro instructions are routed directly to the cryptography unit 617 and direct the unit 617 to load data provided over the load bus 620, or to load a block of input data and begin execution of a prescribed number of cryptographic rounds to produce a block of output data, or to provide a produced block of output data over the store bus 622 for storage in memory by the store logic 618. A second plurality of the associated micro instructions are routed to other execution units 610, 612, 614, 616 to perform other sub-operations that are necessary to accomplish the prescribed cryptographic operation such as testing of the E bit 629, enabling the D bit 631, setting the X bit 625 to indicate that a cryptographic operation is in process, updating registers (e.g., count register, input text pointer register, output text pointer register) within the register stage 605, processing of interrupts 627 indicated by the interrupt logic 626, etc. The associated micro instructions are ordered to provide for optimum performance of specified cryptographic operations on multiple blocks of input data by interlacing integer unit micro instructions within sequences of cryptography unit micro instructions so that integer operations can be accomplished in parallel with cryptography unit operations. Micro instructions are included in the associated micro instructions to allow for and recover from pending interrupts 627. Because all of the pointers to cryptographic parameters and data are provided within x86 architectural registers, their states are saved when interrupts are processed and the states are restored upon return from interrupts. Hence, when an interrupt occurs, program control is transferred to a corresponding interrupt service routine. As part of that transfer of program control, the X bit 625 is cleared to indicated that key data and control word data are no longer valid. Upon return from an interrupt, program control is transferred back to the XCRYPT instruction and as a part of it's associated micro instructions, particular micro instructions test the state of the X bit 625 to determine if key data and control word data are valid. If so, the operation is repeated on the particular block of input data that was being processed when the interrupt occurred. If the state of the X bit 625 indicates that key data and control word data are no longer valid, then the key data and control word are reloaded from memory along with the particular block of input data that was being processed when the interrupt occurred. To summarize, execution of an XCRYPT instruction according to the present invention always involves initial testing of the X bit 625 to determine validity of key data and control word data within the cryptography unit 617. If key data and control word data are not valid, then the key data and control word data are loaded from memory. Then an input data block pointed to by contents of the input pointer register are loaded and the prescribed cryptographic operation is executed on the input data block. Otherwise, the input data block is loaded and the prescribed cryptographic operation is executed without first loading the key data and control word data.

If new key data or a new control word are provided, then it is required that the X bit 625 be cleared prior to executing a new XCRYPT instruction. It is also contemplated that successive XCRYPT instructions can be executed that employ the same key data and control word data. In this case, it is not required to clear the X bit 625 after the initial key data and control word data are loaded. For example, for optimization purposes related to memory bus speed, a user may break up encryption/decryption of, say, 500 input data blocks into 5 XCRYPT instructions that each process 100 input data blocks each.

The OFB mode logic 640 is employed for the performance of cryptographic operations, that utilize the cipher feedback mode. The OFB mode logic 640 ensures that the associated micro instructions are ordered to allow for the pointer registers and intermediate results of a sequence of block cryptographic operations on a sequence of input text blocks to be updated prior to processing interrupts 627. The OFB mode logic 640 directs that micro instructions be inserted into the flow of associated micro instructions such that at the completion of a cryptographic operation on a first block of input data, pointers to the input and output data blocks in memory are modified to point to next input and output data blocks. In addition, the OFB mode logic 640 directs that micro instructions be inserted into the flow of associated micro instructions to modify the block counter to indicate that the cryptographic operation has been completed on the current block of input data. One skilled in the art will appreciate that an encryption operation under the OFB mode employs an initialization vector that is utilized along with a first block of plaintext to produce a first block of ciphertext. A forward cipher operation is applied to the initialization vector to produce a first cipher output block. Then a first ciphertext block is produced by exclusive-ORing the first cipher output block with the first plaintext block. The first cipher output block is then fed forward as an initialization vector equivalent for encryption of a second plaintext block. And so on. An OFB mode decryption is accomplished in the very same manner as an OFB encryption operation except that plaintext blocks are generated by exclusive-ORing ciphertext blocks with cipher output blocks. Forward cipher operations are applied to the initialization vector and subsequent initialization vector equivalents to produce the cipher output blocks.

In one embodiment, the OFB mode logic 640 distinguishes a prescribed OFB mode encryption or decryption operation and provides for a sequence of micro instructions that update pointers within the architectural registers to ensure that, for blocks following a first block of plaintext or ciphertext, the proper initialization vector equivalent is fed forward.

In an alternative embodiment, the OFB mode logic 640 distinguishes a prescribed OFB mode encryption or decryption operation and provides for a sequence of micro instructions that 1) perform an exclusive-OR operation on a current block of plaintext with its corresponding current block of ciphertext to generate a initialization vector equivalent for a next block; 2) store the initialization vector equivalent to the memory location pointed to by contents of the initialization vector pointer register; and 3) update pointers within the architectural registers to ensure that, for blocks following a first block of plaintext or ciphertext, the proper initialization vector equivalent is fed forward.

Now referring to FIG. 7, a diagram is presented illustrating fields within an exemplary micro instruction 700 for directing cryptographic sub-operations within the microprocessor of FIG. 6. The micro instruction 700 includes a micro opcode field 701, a data register field 702, and a register field 703. The micro opcode field 701 specifies a particular sub-operation to be performed and designates logic within one or more stages of the microprocessor 600 to perform the sub-operation. Specific values of the micro opcode field 701 designate that the micro instruction is directed for execution by a cryptography unit according to the present invention. In one embodiment, there are two specific values. A first value (XLOAD) designates that data is to be retrieved from a memory location whose address is specified by contents of an architectural register denoted by contents of the data register field 702. The data is to be loaded into a register within the cryptography unit that is specified by contents of the register field 703. The retrieved data (e.g., cryptographic key data, control word, input text data, initialization vector) is provided to the cryptography unit. A second value (XSTOR) of the micro opcode field 701 designates that data generated by the cryptography unit is to be stored in a memory location whose address is specified by contents of an architectural register denoted by contents of the data register field 702. In a multi-stage embodiment of the cryptography unit, contents of the register field 703 prescribe one of a plurality of output data blocks for storage in memory. The output data block is provided by the cryptography unit in the data field 704 for access by store logic. More specific details concerning XLOAD and XSTOR micro instructions for execution by a cryptography unit according to the present invention will now be discussed with reference to FIGS. 8 and 9.

Turning to FIG. 8, a table 800 is presented depicting values of the register field 703 for an XLOAD micro instruction according to the format 700 of FIG. 7. As was previously discussed, a sequence of micro instructions is generated in response to translation of an XCRPYT instruction. The sequence of micro instructions comprises a first plurality of micro instructions that are directed for execution by the cryptography unit and a second plurality of micro instructions that are executed by one or more of the parallel functional units within the microprocessor other that the cryptography unit. The second plurality of micro instructions direct sub-operations such as updating of counters, temporary registers, architectural registers, testing and setting of status bits in machine specific registers, and so on. The first plurality of instructions provide key data, cryptographic parameters, and input data to the cryptography unit and direct the cryptography unit to generate key schedules (or to load key schedules that have been retrieved from memory), to load and encrypt (or decrypt) input text data, and to store output text data. An XLOAD micro instruction is provided to the cryptography unit to load control word data, to load a cryptographic key or key schedule, to load initialization vector data, to load input text data, and to load input text data and direct the cryptography unit to begin a prescribed cryptographic operation. Value 0b010 in the register field 703 of an XLOAD micro instruction directs the cryptography unit to load a control word into its internal control word register. As this micro instruction proceeds down the pipeline, an architectural control word pointer register within the register stage is accessed to obtain the address in memory where the control word is stored. Address logic translates the address into a physical address for a memory access. The load logic fetches the control word from cache and places the control word in the data field 704, which is then passed to the cryptography unit. Likewise, register field value 0b100 directs the cryptography unit to load input text data provided in the data field 704 and, following the load, to start the prescribed cryptographic operation. Like the control word, the input data is accessed via a pointer stored in an architectural register. Value 0b101 directs that input data provided in the data field 704 be loaded into internal register 1 IN-1. Data loaded into IN-1 register can be either input text data (when pipelining) or an initialization vector. Values 0b110 and 0b111 direct the cryptography unit to load lower and upper bits, respectively, of a cryptographic key or one of the keys in a user-generated key schedule. According to the present application, a user is defined as that which performs a specified function or specified operation. The user can embody an application program, an operating system, a machine, or a person. Hence, the user-generated key schedule, in one embodiment, is generated by an application program. In an alternative embodiment, the user-generated key schedule is generated by a person.

In one embodiment, register field values 0b100 and 0b101 contemplate a cryptography unit that has two stages, whereby successive blocks of input text data can be pipelined. Hence, to pipeline two successive blocks of input data, a first XLOAD micro instruction is executed that provides a first block of input text data to IN-1 followed by execution of a second XLOAD micro instruction that provides a second block of input text data to IN-0 and that also directs the cryptography unit to being performing the prescribed cryptographic operation.

If a user-generated key schedule is employed to perform the cryptographic operation, then a number of XLOAD micro instructions that correspond to the number of keys within the user-generated key schedule are routed to the cryptography unit that direct the unit to load each round key within the key schedule.

All other values of the register field 703 in an XLOAD micro instruction are reserved.

Referring to FIG. 9, a table 900 is presented showing values of the register field 703 for an XSTOR micro instruction according to the format 700 of FIG. 7. An XSTOR micro instruction is issued to the cryptography unit to direct it to provide a generated (i.e., encrypted or decrypted) output text block to store logic for storage in memory at the address provided in the address field 702. Accordingly, translation logic according to the present invention issues an XSTOR micro instruction for a particular output text block following issuance of an XLOAD micro instruction for its corresponding input text block. Value 0b100 of the register field 703 directs the cryptography unit to provide the output text block associated with its internal output-0 OUT-0 register to store logic for storage. Contents of OUT-0 are associated with the input text block provided to IN-0. Likewise, contents of internal output-1 register, referenced by register field value 0b101, are associated with the input text data provided to IN-1. Accordingly, following loading of keys and control word data, a plurality of input text blocks can be pipelined through the cryptography unit by issuing cryptographic micro instructions in the order XLOAD.IN-1, XLOAD.IN-0 (XLOAD.IN-0 directs the cryptography unit to start the cryptographic operation as well), XSTOR.OUT-1, XSTOR.OUT-0, XLOAD.IN-1, XLOAD.IN-0 (starts the operation for the next two input text blocks), and so on.

Figure 10:
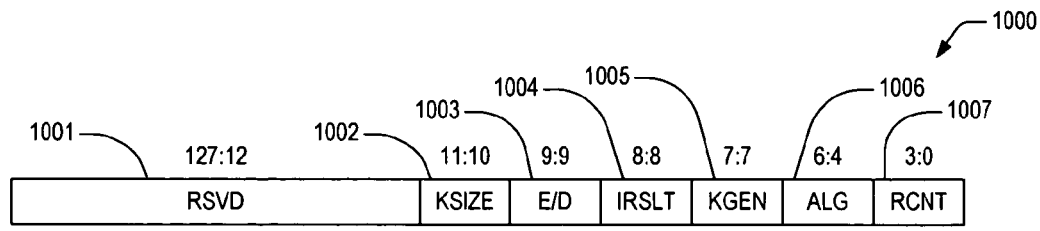
FIG. 10 is diagram highlighting an exemplary control word format for prescribing cryptographic parameters of a cryptography operation according to the present invention.

Now turning to FIG. 10, a diagram is provided highlighting an exemplary control word format 1000 for prescribing cryptographic parameters of a cryptographic operation according to the present invention. The control word 1000 is programmed into memory by a user and its pointer is provided to an architectural register within a conforming microprocessor prior to performing cryptographic operations. Accordingly, as part of a sequence of micro instructions corresponding to a provided XCRYPT instruction, an XLOAD micro instruction is issued directing the microprocessor to read the architectural register containing the pointer, to convert the pointer into a physical memory address, to retrieve the control word 1000 from memory (cache), and to load the control word 1000 into the cryptography unit's internal control word register. The control word 1000 includes a reserved RSVD field 1001, key size KSIZE field 1002, an encryption/decryption E/D field 1003, an intermediate result IRSLT field 1004, a key generation KGEN field 1005, an algorithm ALG field 1006, and a round count RCNT field 1007.

All values for the reserved field 1001 are reserved. Contents of the KSIZE field 1002 prescribe the size of a cryptographic key that is to be employed to accomplish encryption or decryption. In one embodiment, the KSIZE field 1002 prescribes either a 128-bit key, a 192-bit key, or a 256-bit key. The E/D field 1003 specifies whether the cryptographic operation is to be an encryption operation or a decryption operation. The KGEN field 1005 indicates if a user-generated key schedule is provided in memory or if a single cryptographic key is provided in memory. If a single cryptographic key is provided, then micro instructions are issued to the cryptography unit along with the cryptographic key directing the unit to expand the key into a key schedule according to the cryptographic algorithm that is specified by contents of the ALG field 1006. In one embodiment, the ALG field 1006 specifies the DES algorithm, the Triple-DES algorithm, or the AES algorithm as has heretofore been discussed. Alternative embodiments contemplate other cryptographic algorithms such as the Rijndael Cipher, the Twofish Cipher, etc. Contents of the RCNT field 1007 prescribe the number of cryptographic rounds that are to be accomplished on each block of input text according to the specified algorithm. Although the standards for the above-noted algorithms prescribed a fixed number of cryptographic rounds per input text block, provision of the RCNT field 1007 allows a programmer to vary the number of rounds from that specified by the standards. In one embodiment, the programmer can specify from 0 to 15 rounds per block. Finally, contents of the IRSLT field 1004 specify whether encryption/decryption of an input text block is to be performed for the number of rounds specified in RCNT 1007 according to the standard for the cryptographic algorithm specified in ALG 1006 or whether the encryption/decryption is to be performed for the number of rounds specified in RCNT 1007 where the final round performed represents an intermediate result rather than a final result according to the algorithm specified in ALG 1006. One skilled in the art will appreciate that many cryptographic algorithms perform the same sub-operations during each round, except for those performed in the final round. Hence, programming the IRSLT field 1004 to provide intermediate results rather than final results allows a programmer to verify intermediate steps of the implemented algorithm. For example, incremental intermediate results to verify algorithm performance can be obtained by, say, performing one round of encryption on a text block, then performing two rounds on the same text block, then three round, and so on. The capability to provide programmable rounds and intermediate results enables users to verify cryptographic performance, to troubleshoot, and to research the utility of varying key structures and round counts.

Figure 11:
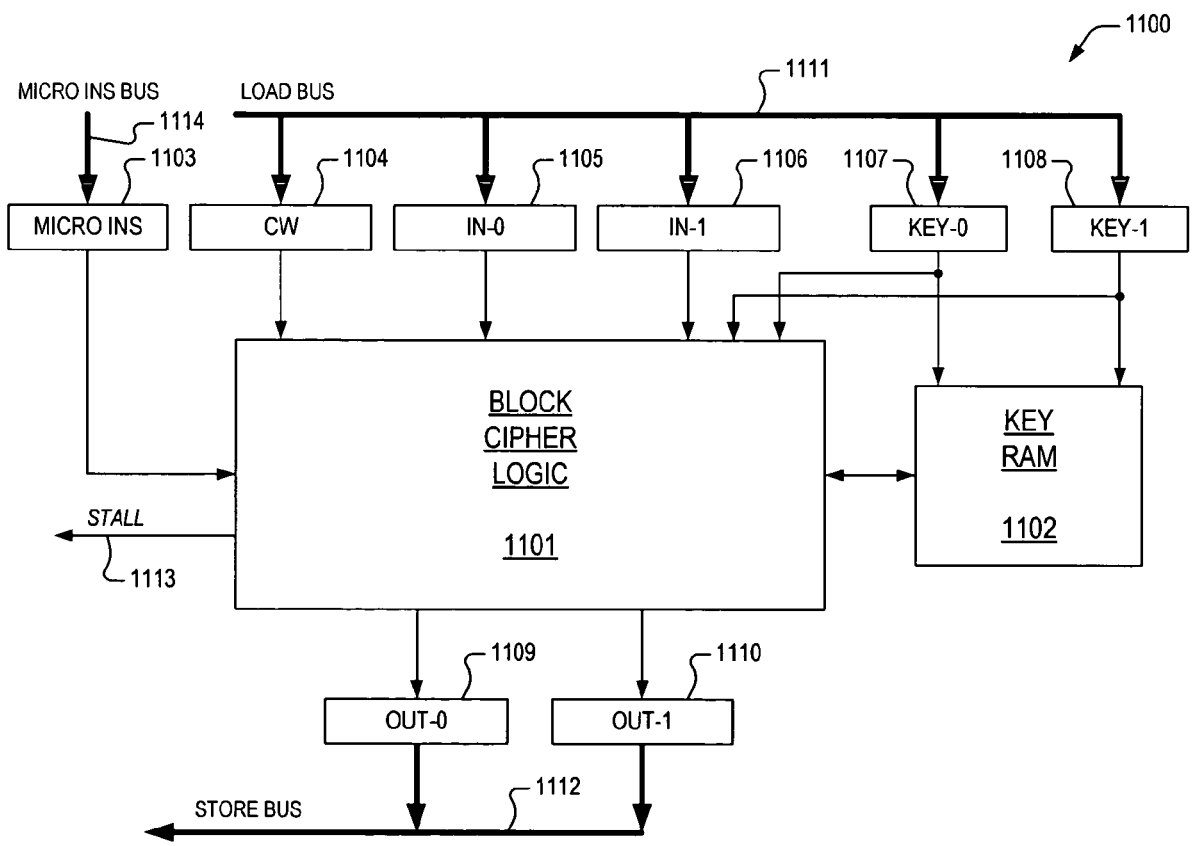
FIG. 11 is a block diagram featuring details of a cryptography unit according to the present invention.

Now referring to FIG. 11, a block diagram is presented featuring details of a cryptography unit 1100 according to the present invention. The cryptography unit 1100 includes a micro opcode register 1103 that receives cryptographic micro instructions (i.e., XLOAD and XSTOR micro instructions) via a micro instruction bus 1114. The cryptography unit 1100 also has a control word register 1104, an input-0 register 1105, and input-1 register 1106, a key-0 register 1107, and a key-1 register 1108. Data is provided to registers 1104-1108 via a load bus 1111 as prescribed by contents of an XLOAD micro instruction within the micro instruction register 1103. The cryptography unit 1100 also includes block cipher logic 1101 that is coupled to all of the registers 1103-1108 and that is also coupled to cryptographic key RAM 1102. The block cipher logic provides a stall signal 1113 and also provides block results to an output-0 register 1109 and an output-1 register 1110. The output registers 1109-1110 route their contents to successive stages in a conforming microprocessor via a store bus 1112. In one embodiment, the micro instruction register 1103 is 32 bits in size and each of the remaining registers 1104-1110 are 128-bit registers.

Operationally, cryptographic micro instructions are provided sequentially to the micro instruction register 1103 along with data that is designated for the control word register 1104, or one of the input registers 1105-1106, or one of the key registers 1107-1108. In the embodiment discussed with reference to FIGS. 8 and 9, a control word is first loaded via an XLOAD micro instruction to the control word register 1104. Then the cryptographic key or key schedule is loaded via successive XLOAD micro instructions. If a 128-bit cryptographic key is to be loaded, then an XLOAD micro instruction is provided designating register KEY-0 1107. If a cryptographic key greater than 128 bits is to be loaded, then an XLOAD micro instruction is provided designating register KEY-0 1107 is provided along with an XLOAD micro instruction designating register KEY-1 1108. If a user-generated key schedule is to be loaded, then successive XLOAD micro instructions designating register KEY-0 1107 are provided. Each of the keys from the key schedule that are loaded are placed, in order, in the key RAM 1102 for use during their corresponding cryptographic round. Following this, input text data (if an initialization vector is not required) is loaded to IN-1 register 1106. If an initialization vector is required, then it is loaded into IN-1 register 1106 via an XLOAD micro instruction. An XLOAD micro instruction to IN-0 register 1105 directs the cryptography unit to load input text data to IN-0 register 1105 and to begin performing cryptographic rounds on input text data in register IN-0 1105 using the initialization vector in IN-1 or in both input registers 1105-1106 (if input data is being pipelined) according to the parameters provided via contents of the control word register 1104. Upon receipt of an XLOAD micro instruction designating IN-0 1105, the block cipher logic starts performing the cryptographic operation prescribed by contents of the control word. If expansion of a single cryptographic key is required, then the block cipher logic generates each of the keys in the key schedule and stores them in the key RAM 1102. Regardless of whether the block cipher logic 1101 generates a key schedule or whether the key schedule is loaded from memory, the key for the first round is cached within the block cipher logic 1101 so that the first block cryptographic round can proceed without having to access the key RAM 1102. Once initiated, the block cipher logic continues executing the prescribed cryptographic operation on one or more blocks of input text until the operation is completed, successively fetching round keys from the key RAM 1102 as required by the cryptographic algorithm which is employed. The cryptography unit 1100 performs a specified block cryptographic operation on designated blocks of input text. Successive blocks of input text are encrypted or decrypted through the execution of corresponding successive XLOAD and XSTOR micro instructions. When an XSTOR micro instruction is executed, if the prescribed output data (i.e., OUT-0 or OUT-1) has not yet completed generation, then the block cipher logic asserts the stall signal 1113. Once the output data has been generated and placed into a corresponding output register 1109-1110, then the contents of that register 1109-1110 are transferred to the store bus 1112.

Figure 12:
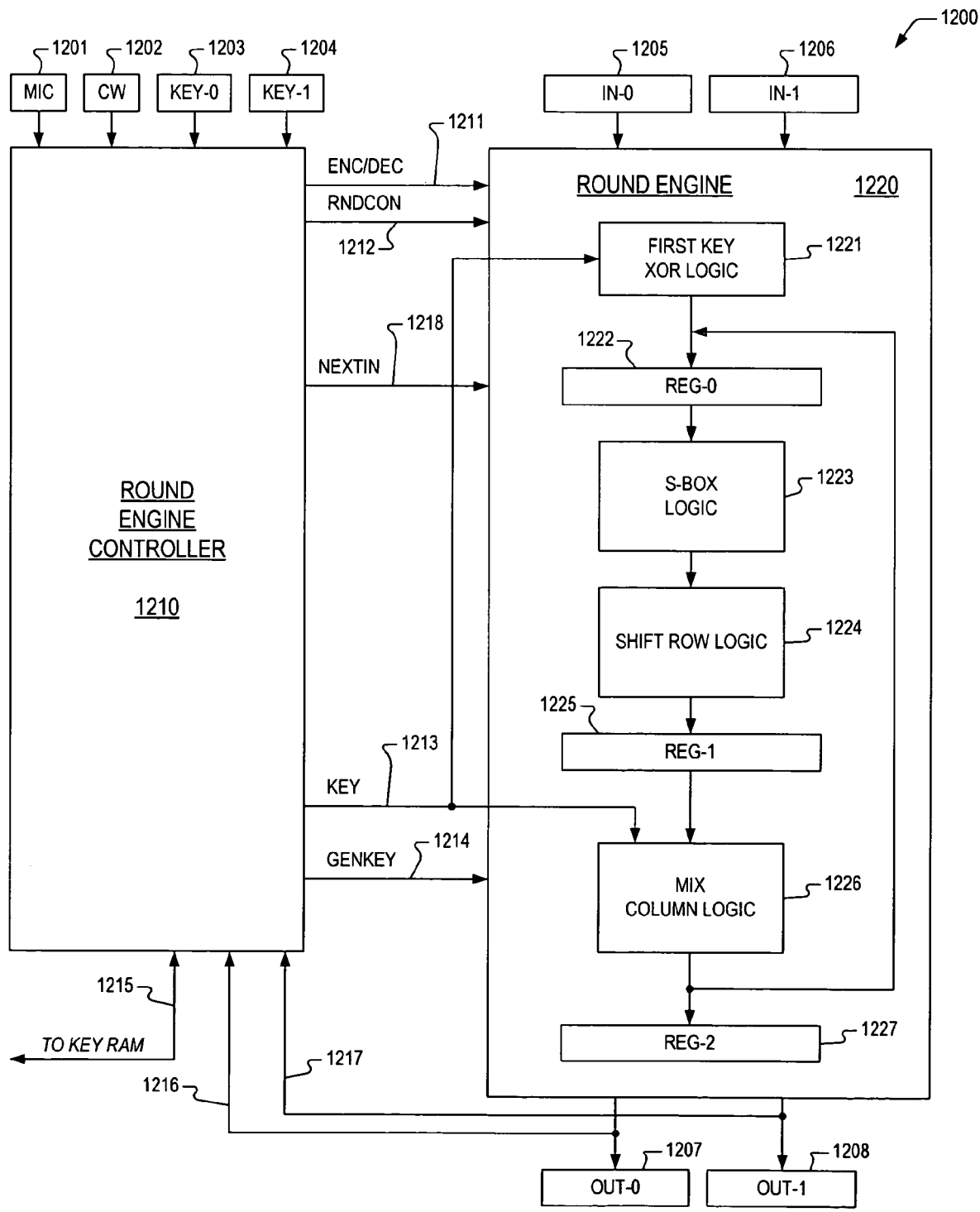
FIG. 12 is a block diagram illustrating an embodiment of block cipher logic according to the present invention for performing cryptographic operations in accordance with the Advanced Encryption Standard (AES)

Now turning to FIG. 12, a block diagram is provided illustrating an embodiment of block cipher logic 1200 according to the present invention for performing cryptographic operations in accordance with the Advanced Encryption Standard (AES). The block cipher logic 1200 includes a round engine 1220 that is coupled to a round engine controller 1210 via buses 1211-1214 and buses 1216-1218. The round engine controller 1210 accesses a micro instruction register 1201, control word register 1202, KEY-0 register 1203, and KEY-1 register 1204 to access key data, micro instructions, and parameters of the directed cryptographic operation. Contents of input registers 1205-1206 are provided to the round engine 1220 and the round engine 1220 provides corresponding output text to output registers 1207-1208. The output registers 1207-1208 are also coupled to the round engine controller 1210 via buses 1216-1217 to enable the round engine controller access to the results of each successive cryptographic round, which is provided to the round engine 1220 for a next cryptographic round via bus NEXTIN 1218. Cryptographic keys from key RAM (not shown) are accessed via bus 1215. Signal ENC/DEC 1211 directs the round engine to employ sub-operations for performing either encryption (e.g., S-Box) or decryption (e.g., Inverse S-Box). Contents of bus RNDCON 1212 direct the round engine 1220 to perform either a first AES round, an intermediate AES round, or a final AES round. Signal GENKEY 1214 is asserted to direct the round engine 1220 to generate a key schedule according to the key provided via bus 1213. Key bus 1213 is also employed to provide each round key to the round engine 1220 when its corresponding round is executed.

The round engine 1220 includes first key XOR logic 1221 that is coupled to a first register REG-0 1222. The first register 1222 is coupled to S-Box logic 1223, which is coupled to Shift Row logic 1224. The Shift Row logic 1224 is coupled to a second register REG-1 1225. The second register 1225 is coupled to Mix Column logic 1226, which is coupled to a third register REG-2 1227. The first key logic 1221, S-Box logic 1223, Shift Row logic 1224, and Mix Column logic 1226 are configured to perform like-named sub-operations on input text data as is specified in the AES FIPS standard discussed above. The Mix Columns logic 1226 is additionally configured to perform AES XOR functions on input data during intermediate rounds as required using round keys provided via the key bus 1213. The first key logic 1221, S-Box logic 1223, Shift Row logic 1224, and Mix Column logic 1226 are also configured to perform their corresponding inverse AES sub-operations during decryption as directed via the state of ENC/DEC 1211. One skilled in the art will appreciate that intermediate round data is fed back to the round engine 1220 according to which particular block encryption mode is prescribed via contents of the control word register 1202. Initialization vector data (if required) is provided to the round engine 1220 via bus NEXTIN 1218.

In the embodiment shown in FIG. 12, the round engine is divided into two stages: a first stage between REG-0 1222 and REG-1 1225 and a second stage between REG-1 1225 and REG-2 1227. Intermediate round data is pipelined between stages in synchronization with a clock signal (not shown). When a cryptographic operation is completed on a block of input data, the associated output data is placed into a corresponding output register 1207-1208. Execution of an XSTOR micro instruction causes contents of a designated output register 1207-1208 to be provided to a store bus (not shown).

Figure 13:
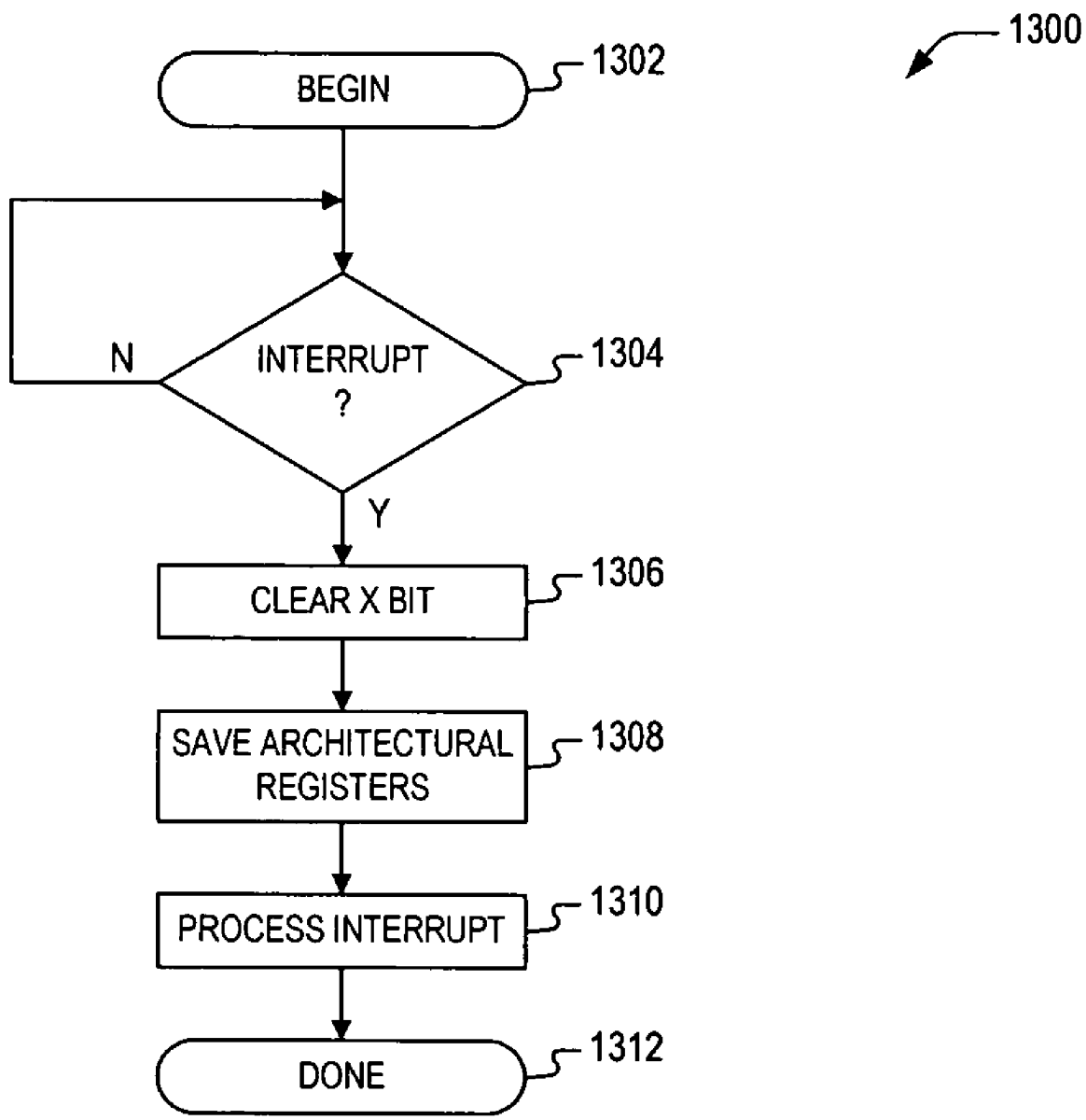
FIG. 13 is a flow chart featuring a method according to the present invention for preserving the state of cryptographic parameters during an interrupting event.

Now turning to FIG. 13, a flow chart is presented featuring a method according to the present invention for preserving the state of cryptographic parameters during an interrupting event. Flow begins at block 1302 when a flow of instructions is executed by a microprocessor according to the present invention. It is not necessary that the flow of instructions include an XCRYPT instruction as is herein described. Flow then proceeds to decision block 1304.

At decision block 1304, an evaluation is made to determine if an interrupting event (e.g., maskable interrupt, non-maskable interrupt, page fault, task switch, etc.) is occurring that requires a change in the flow of instructions over to a flow of instructions ("interrupt handler") to process the interrupting event. If so, then flow proceeds to block 1306. If not, then flow loops on decision block 1304 where instruction execution continues until an interrupting event occurs.

At block 1306, because an interrupting event has occurred, prior to transferring program control to a corresponding interrupt handler, interrupt logic according to the present invention directs that the X bit within a flags register be cleared. Clearing of the X bit ensures that, upon return from the interrupt handler, if a block cryptographic operation was in progress, it will be indicated that one or more interrupting events transpired and that control word data and key data must be reloaded prior to continuing the block cryptographic operation on the block of input data currently pointed to by contents of the input pointer register. Flow then proceeds to block 1308.

At block 1308, all of the architectural registers containing pointers and counters associated with performance of a block cryptographic operation according to the present invention are saved to memory. One skilled in the art will appreciate that the saving of architectural registers is an activity that is typically accomplished in a present data computing device prior to transferring control to interrupt handlers. Consequently, the present invention exploits this aspect of present data architectures to provide for transparency of execution throughout interrupting events. After the registers are saved, flow then proceeds to block 1310.

At block 1310, program flow is transferred to the interrupt handler. Flow then proceeds to block 1312.

At block 1312, the method completes. One skilled in the art will appreciate that the method of FIG. 13 begins again at block 1302 upon return from the interrupt handler.

Figure 14:
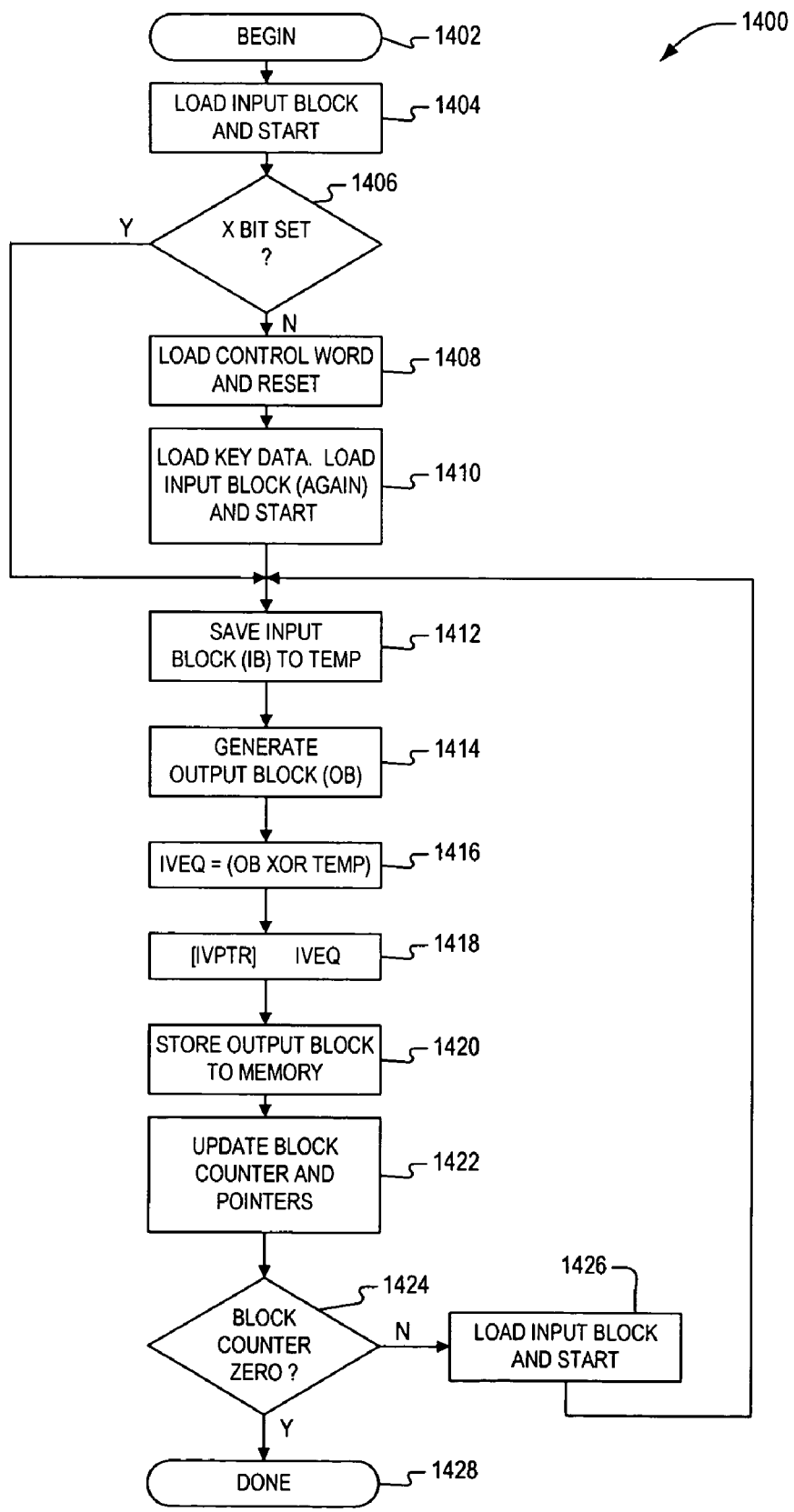
FIG. 14 is a flow chart depicting a method according to the present invention for performing a specified output feedback mode cryptographic operation on a plurality of input data blocks in the presence of one or more interrupting events.

Now referring to FIG. 14, a flow chart is provided depicting a method according to the present invention for performing a specified output feedback mode cryptographic operation on a plurality of input data blocks in the presence of one or more interrupting events.

Flow begins at block 1402, where an XCRPYT instruction according to the present invention that directs a cryptographic operation employing the output feedback mode begins execution. Execution of the XCRYPT instruction can be a first execution or it can be execution following a first execution as a result of interruption of execution by an interrupting event such that program control is transferred back to the XCRYPT instruction after an interrupt handler has executed. Flow then proceeds to block 1404.

At block 1404, a block of data in memory that is pointed to by contents of an input pointer register according to the present invention is loaded from the memory and a prescribed cryptographic operation is started. The specific input pointer register that is employed is determined by which particular cryptographic operation (e.g., encryption or decryption) is prescribed and also by which block cipher mode (e.g., ECB, CBC, CFB, or OFB) is prescribed. For example, if an encryption operation is prescribed using OFB mode, then both the input pointer register and an initialization pointer register are employed to load the data. For an OFB mode encryption operation, the input pointer register points to a next block of plaintext to be encrypted. For an OFB mode decryption operation, the input pointer register points to a next block of ciphertext to be decrypted. For both OFB encryption and decryption, the initialization vector register points to an initialization vector location in memory. For a first block, contents of the initialization vector location in memory are an initialization vector. For subsequent blocks, contents of the initialization vector location are output cipher blocks corresponding to a preceding block which are to be employed as an initialization vector equivalent for a current block. If a decryption operation is prescribed using ECB mode, then the input pointer register which is employed to load the data is the register that points to a next block of ciphertext in memory. Flow then proceeds to decision block 1406.

At decision block 1406, an evaluation is made to determine whether or not an X bit in a flags register is set. If the X bit is set, then it is indicated that the control word and key schedule currently loaded within a cryptography unit according to the present invention are valid. If the X bit is clear, then it is indicated that the control word and key schedule currently loaded within the cryptography unit are not valid. As alluded to above with reference to FIG. 13, the X bit is cleared when an interrupting event occurs. In addition, as noted above, when it is necessary to load a new control word or key schedule or both, it is required that instructions be executed to clear the X bit prior to issuing the XCRYPT instruction. In an X86-compatible embodiment that employs bit 30 within an X86 EFLAGS register, the X bit can be cleared by executing a PUSHFD instruction followed by a POPFD instruction. One skilled in the art will appreciate, however, that in alternative embodiments other instructions must be employed to clear the X bit. If the X bit is set, then flow proceeds to block 1412. IF the X bit is clear, then flow proceeds to block 1408.

At block 1408, since a cleared X bit has indicated that either an interrupting event has occurred or that a new control word and/or key data are to be loaded, a control word is loaded from memory. In one embodiment, loading the control word stops the cryptography unit from performing the prescribed cryptographic operation noted above with reference to block 1404. Starting a cryptographic operation in block 1404 in this exemplary embodiment allows for optimization of multiple block cryptographic operations by presuming that a currently loaded control word and key data are to be employed. Accordingly, the current block of input data is loaded and the cryptographic operation begun prior to checking the state of the X bit in decision block 1406. Flow then proceeds to block 1410.

At block 1410, key data (i.e., a cryptographic key or a complete key schedule) is loaded from memory. In addition, the input block and initialization vector (or initialization vector equivalent) referenced in block 1404 are loaded again and the cryptographic operation is started according to the newly loaded control word and key schedule. Flow then proceeds to block 1412.

At block 1412, the input data block (current ciphertext block or current plaintext block) loaded in either block 1404 or block 1410 is saved to an internal register TEMP. Flow then proceeds to block 1414.

At block 1414, an output block corresponding to the loaded input block is generated. For OFB encryption, the input block is a plaintext block and the output block is a corresponding ciphertext block. For OFB decryption, the input block is a ciphertext block and the output block is a corresponding plaintext block. Flow then proceeds to block 1416.

At block 1416, an initialization vector equivalent IVEQ is generated by exclusive-ORing the output block with contents of TEMP. Flow then proceeds to block 1418.

At block 1418, the initialization vector equivalent IVEQ is written to the memory location pointed to by contents of the initialization vector pointer register IVPTR so that performance of the prescribed OFB mode cryptographic operation on a following input block will employ the proper initialization vector equivalent. Flow then proceeds to block 1420.

The steps described within blocks 1412, 1414, 1416, and 1418 are required to ensure a state that will allow for execution of an XCRYPT instruction that employs the OFB mode of block cryptography to be interrupted at any time. For instance, in one embodiment, a page fault can occur at any point during execution of an XCRPYT instruction.

At block 1420, the generated output block is stored to memory. Flow then proceeds to block 1422.

At block 1422, the contents of input and output block pointer registers are modified to point to next input and output data blocks. In addition, contents of the block counter register are modified to indicate completion of the cryptographic operation on the current input data block. In the embodiment discussed with reference to FIG. 14, the block counter register is decremented. One skilled in the art will appreciate, however, that alternative embodiments contemplate manipulation and testing of contents of the block count register to allow for pipelined execution of input text blocks as well. Flow then proceeds to decision block 1424.

At decision block 1426, an evaluation is made to determine if an input data block remains to be operated upon. In the embodiment featured herein, for illustrative purposes, the block counter is evaluated to determine if it equals zero. If no block remains to be operated upon, then flow proceeds to block 1428. If a block remains to be operated upon, then flow proceeds to block 1426.

At block 1426, the next block of input data is loaded along with initialization vector equivalent, as pointed to by contents of the input pointer register and initialization vector register. Flow then proceeds to block 1412.

At block 1428, the method completes.

One skilled in the art will appreciate that the steps discussed with reference to blocks 1416, 1418, 1420, 1422, and 1424 could occur in a different order along their particular flow paths or they could occur in parallel.

Although the present invention and its objects, features, and advantages have been described in detail, other embodiments are encompassed by the invention as well. For example, the present invention has been discussed at length according to embodiments that are compatible with the x86 architecture. However, the discussions have been provided in such a manner because the x86 architecture is widely comprehended and thus provides a sufficient vehicle to teach the present invention. The present invention nevertheless comprehends embodiments that comport with other instruction set architectures such as PowerPC®, MIPS®, and the like, in addition to entirely new instruction set architectures.

The present invention moreover comprehends execution of cryptographic operations within elements of a computing system other than the microprocessor itself. For example, the cryptographic instruction according to the present invention could easily be applied within an embodiment of a cryptography unit that is not part of the same integrated circuit as a microprocessor that exercises as part of the computer system. It is anticipated that such embodiments of the present invention are in order for incorporation into a chipset surrounding a microprocessor (e.g., north bridge, south bridge) or as a processor dedicated for performing cryptographic operations where the cryptographic instruction is handed off to the processor from a host microprocessor. It is contemplated that the present invention applies to embedded controllers, industrial controllers, signal processors, array processors, and any like devices that are employed to process data. The present invention also comprehends an embodiment comprising only those elements essential to performing cryptographic operations as described herein. A device embodied as such would indeed provide a low-cost, low-power alternative for performing cryptographic operations only, say, as an encryption/decryption processor within a communications system. For clarity, the present inventors refer to these alternative processing elements as noted above as processors.

In addition, although the present invention has been described in terms of 128-bit blocks, it is considered that various different block sizes can be employed by merely changing the size of registers that carry input data, output data, keys, and control words.

Furthermore, although DES, Triple-DES, and AES have been prominently featured in this application, the present inventors note that the invention described herein encompasses lesser known block cryptography algorithms as well such as the MARS cipher, the Rijndael cipher, the Twofish cipher, the Blowfish Cipher, the Serpent Cipher, and the RC6 cipher. What is sufficient to comprehend is that the present invention provides dedicated block cryptography apparatus and supporting methodology within a microprocessor where atomic block cryptographic operations can be invoked via execution of a single instruction.

Also, although the present invention has been featured herein in terms of block cryptographic algorithms and associated techniques for performing block cryptographic functions, it is noted that the present invention entirely comprehends other forms of cryptography other than block cryptography. It is sufficient to observe that a single instruction is provided whereby a user can direct a conforming microprocessor to perform a cryptographic operation such as encryption or decryption, where the microprocessor includes a dedicated cryptography unit that is directed towards accomplishment of cryptographic functions prescribed by the instruction.

Moreover, the discussion of a round engine herein provides for a 2-stage apparatus that can pipeline two blocks of input data, the present inventors note that additional embodiments contemplate more than two stages. It is anticipated that stage division to support pipelining of more input data blocks will evolve in concert with dividing of other stages within a comporting microprocessor.

Finally, although the present invention has been specifically discussed as a single cryptography unit that supports a plurality of block cryptographic algorithms, the invention also comprehends provision of multiple cryptographic units operatively coupled in parallel with other execution units in a conforming microprocessor where each of the multiple cryptographic units is configured to perform a specific block cryptographic algorithm. For example, a first unit is configured for AES, a second for DES, and so on.

Those skilled in the art should appreciate that they can readily use the disclosed conception and specific embodiments as a basis for designing or modifying other structures for carrying out the same purposes of the present invention, and that various changes, substitutions and alterations can be made herein without departing from the spirit and scope of the invention as defined by the appended claims.

What is claimed is:

1. An apparatus for performing cryptographic operations, comprising:
   a cryptographic instruction, received by a pipeline microprocessor as part of an application program executing on said pipeline microprocessor, wherein said cryptographic instruction prescribes one of the cryptographic operations, and wherein said cryptographic instruction is prescribed according to the x86 instruction format, and wherein said one of the cryptographic operations comprises:
      a plurality of OFB block cryptographic operations performed on a corresponding plurality of input text blocks;
   OFB mode logic, operatively coupled to said cryptographic instruction, configured to direct said pipeline microprocessor to update pointer registers and an initialization vector location for each of said plurality of OFB block cryptographic operations;
   execution logic, operatively coupled to said OFB block pointer logic, configured to execute said one of the cryptographic operations; and
   a bit, coupled to said execution logic, configured to indicate whether said one of the cryptographic operations has been interrupted by an interrupting event.

2. The apparatus as recited in claim 1, wherein said one of the cryptographic operations further comprises:
   an OFB mode encryption operation, said OFB mode encryption operation comprising encryption of a plurality of plaintext blocks to generate a corresponding plurality of ciphertext blocks.

3. The apparatus as recited in claim 1, wherein said one of the cryptographic operations further comprises:
   an OFB mode decryption operation, said OFB mode decryption operation comprising decryption of a plurality of ciphertext blocks to generate a corresponding plurality of plaintext blocks.

4. The apparatus as recited in claim 1, wherein said one of the cryptographic operations is accomplished according to the Advanced Encryption Standard (AES) algorithm.

5. The apparatus as recited in claim 1, wherein said cryptographic instruction prescribes that output feedback mode to be employed in accomplishing said one of the cryptographic operations.

6. The apparatus as recited in claim 1, wherein said bit is contained within a flags register.

7. The apparatus as recited in claim 1, wherein said interrupting event comprises a transfer of program control to a program flow configured to process said interrupting event, and wherein execution of said one of the cryptographic operations on a current input text block is interrupted.

8. The apparatus as recited in claim 7, wherein, upon return of program control to said cryptographic instruction, said one of the cryptographic operations is performed on said current input text block.

9. The apparatus as recited in claim 1, wherein said OFB mode logic directs said pipeline microprocessor to modify said pointer registers to point to next input and output text blocks at the completion of each of said plurality of OFB block cryptographic operations on each of said corresponding plurality of input text blocks.

10. The apparatus as recited in claim 1, wherein said OFB mode logic directs said pipeline microprocessor to store a current initialization vector equivalent to a memory location pointed to by an initialization vector register.

11. The apparatus as recited in claim 10, wherein said OFB mode logic directs said pipeline microprocessor to generate said current initialization vector equivalent by exclusive-ORing a current input text block with a current output text block.

12. The apparatus as recited in claim 1, wherein said interrupting event comprises an interrupt, an exception, a page fault, or a task switch.

13. The apparatus as recited in claim 1, wherein said cryptographic instruction implicitly references a plurality of registers within said pipeline microprocessor.

14. The apparatus as recited in claim 13, wherein said plurality of registers comprises:
   a first register, wherein contents of said first register comprise a first pointer to a first memory address, said first memory address specifying a first location in memory for access of said plurality of input text blocks upon which said one of the cryptographic operations is to be accomplished.

15. The apparatus as recited in claim 13, wherein said plurality of registers comprises:
   a second register, wherein contents of said second register comprise a second pointer to a second memory address, said second memory address specifying a second location in said memory for storage of a corresponding plurality of output text blocks, said corresponding plurality of output text blocks being generated as a result of accomplishing said one of the cryptographic operations upon a plurality of input text blocks.

16. The apparatus as recited in claim 13, wherein said plurality of registers comprises:
a third register, wherein contents of said third register indicate a number of text blocks within a plurality of input text blocks.

17. The apparatus as recited in claim 13, wherein said plurality of registers comprises:
a fourth register, wherein contents of said fourth register comprise a third pointer to a third memory address, said third memory address specifying a third location in memory for access of cryptographic key data for use in accomplishing said one of the cryptographic operations.

18. The apparatus as recited in claim 13, wherein said plurality of registers comprises:
a fifth register, wherein contents of said fifth register comprise a fourth pointer to a fourth memory address, said fourth memory address specifying a fourth location in memory, said fourth location comprising said initialization vector location, contents of said initialization vector location comprising an initialization vector or initialization vector equivalent for use in accomplishing said one of the cryptographic operations.

19. The apparatus as recited in claim 13, wherein said plurality of registers comprises:
a sixth register, wherein contents of said sixth register comprise a fifth pointer to a fifth memory address, said fifth memory address specifying a fifth location in memory for access of a control word for use in accomplishing said one of the cryptographic operations, wherein said control word prescribes cryptographic parameters for said one of the cryptographic operations.

20. The apparatus as recited in claim 1, wherein said execution logic comprises:
a cryptography unit, configured execute a plurality of cryptographic rounds on each of said plurality of input text blocks to generate a corresponding each of a plurality of output text blocks, wherein said plurality of cryptographic rounds are prescribed by a control word that is provided to said cryptography unit.

21. An apparatus for performing cryptographic operations, comprising:
a cryptography unit within a pipeline microprocessor, configured to execute one of the cryptographic operations responsive to receipt of a cryptographic instruction within an application program that prescribes said one of the cryptographic operations, wherein said cryptographic instruction is prescribed according to the x86 instruction format, and wherein said one of the cryptographic operations comprises:
plurality of OFB block cryptographic operations performed on a corresponding plurality of input text blocks;
OFB mode logic, operatively coupled to said cryptography unit, configured to direct said pipeline microprocessor to update pointer registers and contents of an initialization vector location for each of said plurality of OFB block cryptographic operations; and
a bit, coupled to said cryptography unit, configured to indicate whether said one of the cryptographic operations has been interrupted by an interrupting event.

22. The apparatus as recited in claim 21, wherein said interrupting event causes a transfer of program control to a program flow configured to process said interrupting event, and wherein execution of said one of the cryptographic operations on a current input text block is interrupted.

23. The apparatus as recited in claim 22, wherein, upon return of program control to said cryptographic instruction, said one of the cryptographic operations is performed on said current input text block.

24. The apparatus as recited in claim 21, wherein said OFB mode logic directs said pipeline microprocessor to modify said pointer registers to point to next input and output text blocks at the completion of each of said plurality of OFB block cryptographic operations on each of said corresponding plurality of input text blocks.

25. The apparatus as recited in claim 21, wherein said OFB mode logic directs said pipeline microprocessor to store an initialization vector equivalent to said initialization vector location, wherein said initialization vector location comprises a memory location pointed to by an initialization vector register.

26. The apparatus as recited in claim 21, wherein said OFB mode logic directs said pipeline microprocessor to generate an initialization vector equivalent by exclusive-ORing a current input text block with a current output text block.

27. A method for performing cryptographic operations in a pipeline microprocessor, the method comprising:
executing one of the cryptographic operations responsive to receiving a cryptographic instruction, wherein the cryptographic instruction is prescribed according to the x86 instruction format, and wherein the cryptographic instruction prescribes the one of the cryptographic operations, said executing comprising:
performing a plurality of OFB mode block operations on a corresponding plurality of input text blocks; and
indicating whether the one of the cryptographic operations has been interrupted by an interrupting event; and
writing an initialization vector equivalent to an initialization vector location for employment by a following one of the plurality of OFB mode block operations on a following one of the plurality of input text blocks.

28. The method as recited in claim 27, further comprising:
transferring program control to a program flow configured to process the interrupting event, and interrupting said executing of the one of the cryptographic operations on the current input text block.

29. The method as recited in claim 28, further comprising:
upon return of program control to the cryptographic instruction following said transferring, performing said executing on the current input text block.

30. The method as recited in claim 27, wherein said receiving comprises:
prescribing an output feedback mode encryption operation as the one of the cryptographic operations.

31. The method as recited in claim 27, wherein said receiving comprises:
prescribing an output feedback mode decryption operation as the one of the cryptographic operations.

32. The method as recited in claim 27, wherein said executing comprises:
accomplishing the one of the cryptographic operations according to the Advanced Encryption Standard (AES) algorithm.

33. The method as recited in claim 27, further comprising:
generating the initialization vector equivalent.

34. The method as recited in claim 33, wherein said generating comprises:
exclusive-ORing a current input text block with a current output text block.

* * * * *